United States Patent
Kanno et al.

(10) Patent No.: US 10,792,902 B2
(45) Date of Patent: Oct. 6, 2020

(54) PRESSURE-SENSITIVE ADHESIVE SHEET (71) Applicant: NITTO DENKO CORPORATION, Ibaraki-shi, Osaka (JP)

(72) Inventors: Ryo Kanno, Ibaraki (JP); Kiyoe Shigetomi, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/305,382

(22) PCT Filed: Apr. 3, 2015

(86) PCT No.: PCT/JP2015/060581
§ 371 (c)(1),
(2) Date: Oct. 20, 2016

(87) PCT Pub. No.: WO2015/163115
PCT Pub. Date: Oct. 29, 2015

(65) Prior Publication Data
US 2017/0043566 A1 Feb. 16, 2017

(30) Foreign Application Priority Data

Apr. 22, 2014 (JP) .................................. 2014-088504

(51) Int. Cl.
*B32B 27/32* (2006.01)
*B32B 27/30* (2006.01)
(Continued)

(52) U.S. Cl.
CPC ................ *B32B 27/30* (2013.01); *B32B 7/12* (2013.01); *B32B 15/04* (2013.01); *B32B 15/08* (2013.01);
(Continued)

(58) Field of Classification Search
CPC ....... B32B 27/30; C09J 7/0207; C09J 7/0217; C09J 183/04; C09J 133/00; C09J 133/02;
(Continued)

(56) References Cited

U.S. PATENT DOCUMENTS 6,524,675 B1 2/2003 Mikami et al.
2008/0011415 A1 1/2008 Kiuchi et al.
(Continued)

FOREIGN PATENT DOCUMENTS

JP 02123182 A * 5/1990
JP 2003-205567 A 7/2003
(Continued)

OTHER PUBLICATIONS

JP H02-123182 Machine Translation.*
(Continued)

*Primary Examiner* — Prashant J Khatri
*Assistant Examiner* — Zachary M Davis
(74) *Attorney, Agent, or Firm* — Sughrue Mion, PLLC (57) ABSTRACT

A pressure-sensitive adhesive sheet has a substrate and a pressure-sensitive adhesive layer laminated on at least one side of the substrate. The sheet is configured such that: pressure-sensitive adhesive force N1, occurring after the pressure-sensitive adhesive layer is attached to a stainless steel plate (430 BA plate) and is left at 23° C. for 10 seconds, is 1.0 [N/20 mm] or less; pressure-sensitive adhesive force N2, occurring after the pressure-sensitive adhesive layer is attached and is aged at 80° C. for 5 minutes, is 3.0 [N/20 mm] or more; and N2/N1 is 5.0 or more.

12 Claims, 1 Drawing Sheet

(51) Int. Cl.

| | |
|---|---|
| *C09J 183/04* | (2006.01) |
| *C09J 133/00* | (2006.01) |
| *B32B 27/00* | (2006.01) |
| *B32B 15/18* | (2006.01) |
| *B32B 27/28* | (2006.01) |
| *C09J 133/06* | (2006.01) |
| *B32B 15/08* | (2006.01) |
| *B32B 27/36* | (2006.01) |
| *B32B 15/04* | (2006.01) |
| *B32B 27/16* | (2006.01) |
| *C09J 7/38* | (2018.01) |
| *C08L 33/06* | (2006.01) |
| *B32B 7/12* | (2006.01) |
| *C08G 77/20* | (2006.01) |
| *C09J 133/08* | (2006.01) |

(52) U.S. Cl.
CPC .............. *B32B 15/18* (2013.01); *B32B 27/00* (2013.01); *B32B 27/16* (2013.01); *B32B 27/283* (2013.01); *B32B 27/308* (2013.01); *B32B 27/36* (2013.01); *C08L 33/06* (2013.01); *C09J 7/38* (2018.01); *C09J 133/00* (2013.01); *C09J 133/06* (2013.01); *C09J 183/04* (2013.01); *B32B 2307/542* (2013.01); *B32B 2307/732* (2013.01); *B32B 2309/02* (2013.01); *B32B 2309/04* (2013.01); *B32B 2405/00* (2013.01); *C08G 77/20* (2013.01); *C09J 133/08* (2013.01); *C09J 2301/122* (2020.08); *C09J 2301/124* (2020.08); *C09J 2301/302* (2020.08); *C09J 2433/00* (2013.01); *C09J 2483/00* (2013.01)

(58) Field of Classification Search
CPC .... C09J 133/04; C09J 133/06; C09J 133/062; C09J 133/064; C09J 133/066; C09J 133/068; C09J 133/08; C09J 133/10; C09J 133/12; C09J 133/14; C09J 133/16; C09J 183/10; C08F 18/00; C08F 18/02; C08F 18/14; C08F 18/16; C08F 18/18; C08F 20/00; C08F 20/02; C08F 20/04; C08F 20/06; C08F 20/10; C08F 20/12; C08F 20/14; C08F 20/16; C08F 20/18; C08F 20/20; C08F 20/26; C08F 20/28; C08F 20/30; C08F 20/32; C08F 20/34; C08F 20/36; C08F 20/38; C08F 20/40; C08F 220/00; C08F 220/02; C08F 220/04; C08F 220/06; C08F 220/10; C08F 220/12; C08F 220/14; C08F 220/16; C08F 220/18; C08F 220/20; C08F 220/26; C08F 220/28; C08F 220/30; C08F 220/32; C08F 220/34; C08F 220/36; C08F 220/38; C08F 220/40; C08G 77/42; C08G 77/44; C08L 33/00; C08L 33/02; C08L 33/04; C08L 33/06; C08L 33/062; C08L 33/064; C08L 33/066; C08L 33/068; C08L 33/08; C08L 33/10; C08L 33/12; C08L 33/14; C08L 33/16; C08L 83/10; C09D 133/00; C09D 133/02; C09D 133/04; C09D 133/06; C09D 133/062; C09D 133/064; C09D 133/066; C09D 133/068; C09D 133/08; C09D 133/10; C09D 133/12; C09D 133/14; C09D 133/16; C09D 183/10
See application file for complete search history.

(56) References Cited

U.S. PATENT DOCUMENTS

| | | |
|---|---|---|
| 2010/0101723 A1 | 4/2010 | Okamoto et al. |
| 2011/0020642 A1 | 1/2011 | Yaguchi et al. |
| 2014/0191431 A1 | 7/2014 | Uehara et al. |
| 2015/0024198 A1 | 1/2015 | Yamagata et al. |
| 2016/0032154 A1 | 2/2016 | Kanno et al. |

FOREIGN PATENT DOCUMENTS

| | | | |
|---|---|---|---|
| JP | 2003-238923 | A | 8/2003 |
| JP | 2005-060554 | A | 3/2005 |
| JP | 2006-299283 | A | 11/2006 |
| JP | 2007-186649 | A | 7/2007 |
| JP | 2008-021871 | A | 1/2008 |
| JP | 2008-285657 | A | 11/2008 |
| JP | 2009-067824 | A | 4/2009 |
| JP | 2011-184603 | A | 9/2011 |
| JP | 2014-25073 | A | 2/2014 |
| JP | 2014-030958 | A | 2/2014 |
| JP | 2014-031438 | A | 2/2014 |
| JP | 5430722 | B2 | 3/2014 |
| JP | 2014-224227 | A | 12/2014 |
| JP | 2014-227520 | A | 12/2014 |
| WO | 2009/119885 | A1 | 10/2009 |
| WO | 2010/032583 | A1 | 3/2010 |
| WO | 2010/092906 | A1 | 8/2010 |
| WO | 2013/031710 | A1 | 3/2013 |
| WO | 2013/150770 | A1 | 10/2013 |

OTHER PUBLICATIONS

Shin-Etsu Silicone_Silicone Materials for Modification Datasheet, obtained from http://www.shinetsusilicone-global.com/products/usage/resin_modification/ on May 3, 2017.*
Monomers Guide 2012, retrieved from http://www.polysciences.com/skin/frontend/default/polysciences/pdf/Monomers_Guide_2012%20.pdf.*
JP H02-123182 Translation.*
"Thermal Transitions of Homopolymers", https://www.sigmaaldrich.com/content/dam/sigma-aldrich/docs/Aldrich/General_Information/thermal_transitions_of_homopolymers.pdf, Accessed Sep. 27, 2017.*
"BASF Specialty Monomers Technical Data", http://www.specialty-monomers.basf.com/portal/streamer?fid=235715, Accessed Sep. 27, 2017.*
Utracki, "Glass Transition Temperatures in Polymer Blends", 1985, Advances in Polymer Technology, vol. 5, Issue 1, pp. 33-39.*
International Search Report for PCT/JP2015/060581 dated Jun. 9, 2015 [PCT/ISA/210].
Written Opinion for PCT/JP2015/060581 dated Jun. 9, 2015 [PCT/ISA/237].
Prior Art Search dated Nov. 2, 2016 from the Korean Intellectual Property Office in counterpart application No. 10-2016-7029062.
Notification of First Office Action dated Aug. 26, 2016 from the State Intellectual Property Office of the P.R.C. in counterpart application No. 201580001900.0.
Decision of Rejection dated Apr. 7, 2017 issued by the State Intellectual Property Office of the People's Republic of China in counterpart application No. 201580001900.0.
Notice of Preliminary Rejection dated Dec. 22, 2016 from the Korean Intellectual Property Office in counterpart application No. 10-2016-7029062.
Presentation of Publications dated Apr. 26, 2018, submitted to the Japan Patent Office in corresponding Japanese Application No. 2016-029035.
Notification of Reason for Refusal dated Sep. 5, 2019 from Korean Intellectual Property Office in counterpart KR Application No. 10-2017-7014979.
Notice of Reasons for Refusal dated Aug. 13, 2020 from Japanese Patent Office in JP Application No. 2019-062917.

* cited by examiner

PRESSURE-SENSITIVE ADHESIVE SHEET

CROSS-REFERENCE TO RELATED APPLICATIONS

This application is based upon and claims the benefit of priority from the prior Japanese Patent Application No. 2014-088504, filed on Apr. 22, 2014, and International Patent Application No. PCT/JP 2015/060581, filed on Apr. 3, 2015, the entire content of each of which is incorporated herein by reference.

BACKGROUND OF THE INVENTION

1. Field of the Invention

The present invention relates to a pressure-sensitive adhesive sheet.

2. Description of the Related Art

Pressure-sensitive adhesive sheets having large pressure-sensitive adhesive force from the beginning of attachment are conventionally known. When an adherend (e.g., a brittle material) is fixed by using such a pressure-sensitive adhesive sheet, a pressure-sensitive adhesive sheet having pressure-sensitive adhesive force enough to fix the adherend is selected. On the other hand, bubbles, which are mixed in when a pressure-sensitive adhesive sheet is attached to an adherend, are not preferable from the viewpoints of aesthetic appearance and adhesiveness, and hence there may be a case where the pressure-sensitive adhesive sheet is required to be reattached. However, in the case of a pressure-sensitive adhesive sheet having large pressure-sensitive adhesive force, such reattachment work is difficult.

So, techniques for reducing such bubbles have been devised. For example, a technique has been devised, in which a concavo-convex surface form is created in the bonding surface of a pressure-sensitive adhesive by an embossed liner (see Patent Document 1). In this case, even if a bubble is mixed in between the pressure-sensitive adhesive and an adherend when they are attached together, the air is likely to flow out via the grooves on the surface of the pressure-sensitive adhesive, and hence the bubble can be easily removed without the pressure-sensitive adhesive being reattached.

RELATED ART DOCUMENT

Patent Document

[Patent Document 1] Japanese Patent Application Publication No. 2006-299283

However, the aforementioned pressure-sensitive adhesive is required to have a certain amount of thickness in order to form grooves. Additionally, when this pressure-sensitive adhesive is slightly attached to an adherend, a bonding surface becomes small due to the grooves, and hence work, such as rework or position readjustment, can be easily performed, but sufficient adhesive force may not be obtained.

On the other hand, when a pressure-sensitive adhesive sheet, having large pressure-sensitive adhesive force from the beginning of attachment, is used, it becomes difficult to peel the pressure-sensitive adhesive sheet from an adherend even when a person tries to reattach the pressure-sensitive adhesive sheet due to mixing-in of a bubble or misalignment of attachment positions. If an adherend is a brittle material, the brittle material may be damaged if a person tries to forcibly peel the pressure-sensitive adhesive sheet from the brittle material. Accordingly, if a bubble is mixed in between a brittle material that is an adherend and the pressure-sensitive adhesive sheet when they are attached together, it is difficult to remove the bubble.

SUMMARY OF THE INVENTION

The present invention has been made in view of these situations, and a purpose thereof is to provide a pressure-sensitive adhesive sheet in which pressure-sensitive adhesive force required for fixing an adherend is exhibited and bubbles that may be present between the pressure-sensitive adhesive sheet and an adherend are reduced.

In order to solve the aforementioned problems, a pressure-sensitive adhesive sheet according to an aspect of the present invention comprises a substrate and a pressure-sensitive adhesive layer laminated on at least one side of the substrate, and is configured such that: pressure-sensitive adhesive force N1, occurring after the pressure-sensitive adhesive layer is attached to a stainless steel plate (430 BA plate) and is left at 23° C. for 10 seconds, is 1.0 [N/20 mm] or less; pressure-sensitive adhesive force N2, occurring after the pressure-sensitive adhesive layer is attached and is aged at 80° C. for 5 minutes, is 3.0 [N/20 mm] or more; and N2/N1 is 5.0 or more.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

In order to solve the aforementioned problems, a pressure-sensitive adhesive sheet according to an aspect of the present embodiment comprises a substrate and a pressure-sensitive adhesive layer laminated on at least one side of the substrate, and is configured such that: pressure-sensitive adhesive force N1, occurring after the pressure-sensitive adhesive layer is attached to a stainless steel plate (430 BA plate) and is left at 23° C. for 10 seconds, is 1.0 [N/20 mm] or less; pressure-sensitive adhesive force N2, occurring after the pressure-sensitive adhesive layer is attached and is aged at 80° C. for 5 minutes, is 3.0 [N/20 mm] or more; and N2/N1 is 5.0 or more.

The storage modulus at 23° C. of the pressure-sensitive adhesive layer, which is measured by dynamic viscoelasticity measurement under a condition of shear strain at a frequency of 1 Hz, may be $1 \times 10^6$ Pa or less.

Additionally, the thickness of the substrate may be 1 μm or more but 100 μm or less. Additionally, the total thickness of the pressure-sensitive adhesive sheet may be 3 μm or more but 500 μm or less.

Additionally, the pressure-sensitive adhesive layer may include: 100 parts by mass of a polymer (A) having a glass transition temperature lower than 0° C.; and 0.1 to 20 parts by mass of a polymer (B) that contains, as monomer units, one of monomers having a functional group equivalent of 1000 g/mol or more but less than 15000 g/mol and having a polyorganosiloxane backbone and one of monomers having a glass transition temperature of 40° C. or higher, and that has a weight average molecular weight of 10000 or more but less than 100000.

Additionally, the polymer (A) may be an acrylic polymer. Additionally, the polymer (B) may be a polymer containing, as a monomer unit, 10% by mass to 80% by mass of a monomer having a glass transition temperature of 40° C. or higher.

Additionally, the monomer having the polyorganosiloxane backbone may be one or more monomers selected from the group of monomers represented by the following general formula (1) or (2):

[Chemical Formula 1]

(1)

[Chemical Formula 2]

(2)

[In the formulae (1) and (2), $R^3$ is hydrogen or methyl, $R^4$ is methyl or a monovalent organic group, and m and n are integers of 0 or more.]

Appropriate combinations of the aforementioned respective elements will also be within the scope of the present invention sought to be protected by the patent application.

According to the present embodiment, pressure-sensitive adhesive force required for fixing an adherend can be exhibited and bubbles present between a pressure-sensitive adhesive sheet and an adherend can be reduced.

A pressure-sensitive adhesive composition according to an embodiment comprises a polymer (A) and a polymer (B).

Hereinafter, each component that forms a pressure-sensitive adhesive composition according to an embodiment will be described in detail.
[Polymer (A)]

The polymer (A) is a polymer having a glass transition temperature lower than 0° C. The polymer (A) is not particularly limited as far as the glass transition temperature of which is lower than 0° C., and various polymers to be generally used as a pressure-sensitive adhesive, such as an acrylic polymer, rubber polymer, silicone polymer, polyurethane polymer, and polyester polymer, can be used. In particular, when the polymer (B) is a (meth)acrylic polymer, an acrylic polymer, which is easily compatible with the (meth)acrylic polymer and has high transparency, is preferable.

The glass transition temperature (Tg) of the polymer (A) is lower than 0° C., preferably lower than –10° C., and more preferably lower than –40° C. but usually –80° C. or higher. If the glass transition temperature (Tg) of the polymer (A) is 0° C. or higher, it becomes difficult for the polymer to flow, and hence an increase in pressure-sensitive adhesive force occurring over time may be inferior.

The glass transition temperature is a nominal value described in documents, catalogs, or the like, or a value calculated based on the following equation (X) (Fox Equation).

$$1/Tg = W_1/Tg_1 + W_2/Tg_2 + \ldots + W_n/Tg_n \quad (X)$$

[In the equation (X), Tg represents the glass transition temperature (unit: K) of the polymer (A), $Tg_i$ (i=1, 2, ..., n) the glass transition temperature (unit: K) of a homopolymer formed by a monomer i, and $W_i$ (i=1, 2, ..., n) the mass fraction of the monomer i in the total monomer components.]

The above equation (X) is adopted when the polymer (A) is formed of n types of monomer components of monomer 1, monomer 2, ..., monomer n.

In the present description, the "glass transition temperature of a homopolymer formed" means the "glass transition temperature of a homopolymer formed of the monomer", which means the glass transition temperature (Tg) of a polymer formed only by a monomer (sometimes referred to as a "monomer X") as a monomer component. Specifically, those values are described in "Polymer Handbook" (Third Edition, John Wiley & Sons, Inc, 1989). The glass transition temperatures (Tg) of homopolymers, which are not described in the above document, mean the values obtained, for example, by the following measuring method. That is, into a reactor provided with a thermometer, a stirrer, a nitrogen inlet pipe, and a reflux cooling pipe, 100 parts by mass of the monomer X, 0.2 parts by mass of 2,2'-azobisisobutyronitrile, and 200 parts by mass of ethyl acetate as a polymerization solvent are placed, and the mixture is stirred for 1 hour while nitrogen gas is being introduced. After the oxygen in the polymerization system is removed in this way, the mixture is heated to 63° C. to react with each other for 10 hours. Subsequently, the mixture is cooled to room temperature to obtain a homopolymer solution having a solid concentration of 33% by mass. Subsequently, this homopolymer solution is caused to flow on a release liner to be coated thereon, and the solution is then dried to produce a test sample (sheet-shaped homopolymer) having a thickness of approximately 2 mm. Then, 1 to 2 mg of this test sample is weighed and placed in an aluminum open cell, so that Reversing Heat Flow (specific heat component) behaviors of the homopolymer are obtained by using a temperature-modulated DSC (product name: "Q-2000" made by TA Instruments Inc.) at a heating rate of 5° C./min under 50 ml/min of a nitrogen flow rate atmosphere. With reference to JIS-K-7121, the temperature at the point where a straight line, located at the same distance in the vertical axis direction from a straight line obtained by extending the base line on the low-temperature side of the obtained Reversing Heat Flow and from a straight line obtained by extending the base line on the high-temperature side thereof, and a curved line, located at the portion where the glass transition temperature is changed in a stepwise shape, intersect with each other is determined to be the glass transition temperature (Tg) of the homopolymer.

The weight average molecular weight (Mw) of the polymer (A) is, for example, approximately 30,000 to 5,000,000. If the weight average molecular weight (Mw) is less than 30,000, the cohesive force of a pressure-sensitive adhesive becomes insufficient, and hence adhesion reliability may be inferior. On the other hand, if the weight average molecular weight (Mw) is more than 5,000,000, the flow property of a pressure-sensitive adhesive becomes poor, and hence an increase in pressure-sensitive adhesive force occurring over time may be inferior. From the viewpoint of air releasability (bubble releasability), it is preferable that the weight average molecular weight (Mw) of the polymer (A) is approximately 800,000 to 5,000,000.

[Acrylic Polymer]

Hereinafter, an acrylic polymer, which is a preferred specific example of the polymer (A), will be described in detail.

An acrylic polymer is a polymer containing, as a monomer unit, 50% by mass or more of a (meth)acrylic acid alkyl ester having, for example, a $C_{1-20}$ linear or branched alkyl group. Additionally, the acrylic polymer may have a structure formed by only a (meth)acrylic acid alkyl ester having a $C_{1-20}$ alkyl group or by a combination of two or more thereof. A method of obtaining the acrylic polymer is not particularly limited, but the polymer can be obtained by applying various polymerization methods that are generally used as a method of synthesizing an acrylic polymer, such as solution polymerization, emulsion polymerization, block polymerization, suspension polymerization, and radiation curing polymerization.

The ratio of the (meth)acrylic acid alkyl ester having a $C_{1-20}$ linear or branched alkyl group to the total mass of the monomer components for preparing the acrylic polymer is 50% by mass to 99.9% by mass, preferably 60% by mass to 98% by mass, and more preferably 70% by mass to 95% by mass.

Examples of a (meth)acrylic acid alkyl ester having a $C_{1-20}$ linear or branched alkyl group include for example: (meth)acrylic acid $C_{1-20}$ alkyl esters, [preferably (meth)acrylic acid $C_{2-14}$ alkyl esters, and more preferably (meth)acrylic acid $C_{2-10}$ alkyl esters], such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid 2-ethylhexyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, (meth)acrylic acid dodecyl, (meth)acrylic acid tridecyl, (meth)acrylic acid tetradecyl, (meth)acrylic acid pentadecyl, (meth)acrylic acid hexadecyl, (meth)acrylic acid heptadecyl, (meth)acrylic acid octadecyl, (meth)acrylic acid isooctadecyl, (meth)acrylic acid nonadecyl, and (meth)acrylic acid eicosyl; and the like. Herein, the (meth)acrylic acid alkyl ester means an acrylic acid alkyl ester and/or a methacrylic acid alkyl ester, and all of the "(meth) . . . " expressions have the same meaning. It is preferable to use a (meth)acrylic acid $C_{6-10}$ alkyl ester from the viewpoint of air releasability (bubble releasability).

The acrylic polymer may contain another monomer component (copolymerizable monomer) that is copolymerizable with the (meth)acrylic acid alkyl ester, if necessary, in order to improve cohesive force, heat resistance, and a bridging characteristic, etc. Accordingly, the acrylic polymer may contain a copolymerizable monomer along with the (meth)acrylic acid alkyl ester as a major component. A monomer having a polar group can be preferably used as the copolymerizable monomer.

Specific examples of the copolymerizable monomer include: carboxyl group-containing monomers, such as acrylic acid, methacrylic acid, carboxyethyl acrylate, carboxypentyl acrylate, itaconic acid, maleic acid, fumaric acid, crotonic acid, and isocrotonic acid; hydroxyl group-containing monomers, such as (meth)acrylic acid hydroxyalkyls including (meth)acrylic acid 2-hydroxyethyl, (meth)acrylic acid 2-hydroxypropyl, (meth)acrylic acid 2-hydroxybutyl, (meth)acrylic acid 3-hydroxypropyl, (meth)acrylic acid 4-hydroxybutyl, (meth)acrylic acid 6-hydroxyhexyl, (meth)acrylic acid 8-hydroxyoctyl, (meth)acrylic acid 10-hydroxydecyl, (meth)acrylic acid 12-hydroxy lauryl, (4-hydroxymethyl cyclohexyl)methyl methacrylate, and the like; acid anhydride group-containing monomers, such as maleic acid anhydride and itaconic acid anhydride; sulfonic group-containing monomers, such as styrenesulfonic acid, allylsulfonic acid, 2-(meth)acrylamide-2-methylpropanesulfonic acid, (meth)acrylamide propanesulfonic acid, sulfopropyl (meth)acrylate, and (meth)acryloyloxy naphthalenesulfonic acid; phosphate group-containing monomers, such as 2-hydroxyethylacryloyl phosphate; (N-substituted)amide monomers, such as (meth)acrylamide, N,N-dialkyl(meth)acrylamides including N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, N,N-di(t-butyl)(meth)acrylamide, and the like, N-ethyl(meth)acrylamide, N-isopropyl(meth)acrylamide, N-butyl(meth)acrylamide, N-n-butyl(meth)acrylamide, N-methylol(meth)acrylamide, N-ethylol(meth)acrylamide, N-methylol propane(meth)acrylamide, N-methoxymethyl (meth)acrylamide, N-methoxyethyl(meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-laurylmaleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; vinyl esters, such as vinyl acetate and vinyl propionate; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloyl pyrrolidine, N-vinyl morpholine, N-vinyl-2-piperidone, N-vinyl-3-morpholinone, N-vinyl-2-caprolactam, N-vinyl-1,3-oxazine-2-one, N-vinyl-3,5-morpholinedione, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyano-containing monomers, such as acrylonitrile and methacrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; styrene monomers, such as styrene and α-methylstyrene; epoxy group-containing acrylic monomers, such as (meth)acrylic acid glycidyl; acrylic acid ester monomers having a heterocycle, halogen atom, silicon atom, or the like, such as (meth)acrylic acid tetrahydrofurfuryl, fluorine atom-containing (meth)acrylate, and silicone (meth)acrylate; olefin monomers, such as isoprene, butadiene, and isobutylene; vinyl ether monomers, such as methyl vinyl ether and ethyl vinyl ether; vinyl esters, such as vinyl acetate and vinyl propionate; aromatic vinyl compounds, such as vinyl toluene and styrene; olefins or dienes, such as ethylene, butadiene, isoprene, and isobutylene; vinyl ethers, such as vinyl alkyl ether; vinyl chloride; sulfonic acid group-containing monomers, such as vinyl sulfonate sodium; imide group-containing monomers, such as cyclohexyl maleimide and isopropyl maleimide; isocyanate group-containing monomers, such as 2-isocyanate ethyl (meth)acrylate; acryloyl morpholine; (meth)acrylic acid esters having an alicyclic hydrocarbon group, such as cyclopentyl(meth)acrylate, cyclohexyl(meth)acrylate, isobornyl (meth)acrylate, and dicyclopentanyl(meth)acrylate; (meth) acrylic acid esters having an aromatic hydrocarbon group, such as phenyl(meth)acrylate, and phenoxyethyl(meth)acrylate; (meth)acrylic acid esters obtained from terpene compound derivative alcohols; and the like. These copolymerizable monomers can be used alone or in combination of two or more thereof.

In the pressure-sensitive adhesive composition of the aforementioned aspect, it is preferable that the acrylic polymer contains, as a monomer unit, at least one monomer selected from the group consisting of N-vinyl cyclic amides represented by the following general formula (M1) and hydroxyl group-containing monomers. It is particularly preferable to use a monomer selected from the group consisting of the N-vinyl cyclic amides.

[Chemical Formula 3]

(M1)

In the general formula (M1), $R^1$ is a divalent organic group.

Specific examples of the N-vinyl cyclic amides include N-vinyl-2-pyrrolidone, N-vinyl-2-piperidone, N-vinyl-3-morpholinone, N-vinyl-2-caprolactam, N-vinyl-1,3-oxazine-2-one, N-vinyl-3,5-morpholinedione, and the like. Among them, N-vinyl-2-pyrrolidone and N-vinyl-2-caprolactam are particularly preferred. The use amount of a monomer selected from the group consisting of the N-vinyl cyclic amides is not particularly limited, but a copolymerizable monomer can be contained in an amount of usually 0.01% by mass to 40% by mass, preferably 0.1% by mass to 30% by mass, and more preferably 0.5% by mass to 20% by mass, based on the total mass of the monomer components for preparing the acrylic polymer.

As specific examples of the hydroxyl group-containing monomers, (meth)acrylic acid 2-hydroxyethyl, (meth) acrylic acid 4-hydroxybutyl, (meth)acrylic acid 6-hydroxyhexyl, and the like, can be preferably used. The use amount of the hydroxy group-containing monomer is not particularly limited, but a copolymerizable monomer can be used in an amount of usually 40% by mass or less, preferably 20% by mass or less, and more preferably 10% by mass, based on the total mass of the monomer components for preparing the acrylic polymer.

By containing 0.01% by mass or more of the copolymerizable monomer, it can be prevented that the cohesive force of the pressure-sensitive adhesive sheet having a pressure-sensitive adhesive layer formed by the acrylic pressure-sensitive adhesive composition may be decreased. By containing the copolymerizable monomer in an amount of 40% by mass or less, it can be prevented that cohesive force may become too large, and the tackiness at normal temperature (25° C.) can be improved.

In the present embodiment, when the pressure-sensitive adhesive sheet is used in a metal adherend or an adherend on which a metal film is formed (e.g., a touch panel, etc., on which a conductive film (ITO) is formed), it is desirable that a carboxyl group is not contained in the acrylic polymer. Also, from the viewpoint of corrosiveness, it is desirable that acidic functional groups, other than a carboxyl group, are not substantially contained therein. Accordingly, the monomer constituent unit that forms the acrylic polymer of the present embodiment may not substantially contain a monomer having a carboxyl group or an acidic functional group other than a carboxyl group.

The acidic functional group means a functional group having active hydrogen. Examples of the acidic functional group include, for example, a carboxyl group, sulfonate group, phosphate group, etc. The expression that acidic functional groups "are not substantially contained" means that they are not actively combined, except the case where they are inevitably mixed. Specifically, it is meant that the ratio (% by mass) of a monomer having an acidic functional group to the total mass of constituent units for forming the acrylic polymer is less than 1% by mass, and preferably less than 0.5% by mass.

Additionally, the acrylic polymer may contain, if necessary, a polyfunctional monomer for adjusting the cohesive force of the pressure-sensitive adhesive composition to be formed.

Examples of the polyfunctional monomer include, for example, (poly)ethylene glycol di(meth)acrylate, (poly)propylene glycol di(meth)acrylate, neopentyl glycol di(meth) acrylate, pentaerythritol di(meth)acrylate, pentaerythritol tri (meth)acrylate, dipentaerythritol hexa(meth)acrylate, 1,2-ethylene glycol di(meth)acrylate, 1,6-hexanediol di(meth) acrylate, 1,12-dodecanediol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyldiol(meth)acrylate, hexyldiol(meth)acrylate, and the like. Among them, trimethylolpropane tri(meth) acrylate, hexanediol di(meth)acrylate, and dipentaerythritol hexa(meth)acrylate can be preferably used. The polyfunctional monomers can be used alone or in combination of two or more thereof.

The use amount of the polyfunctional monomer is changed depending on the molecular weight or the number of functional groups thereof, but the polyfunctional monomer is added in an amount of 0.01% by mass to 3.0% by mass, preferably 0.02% by mass to 2.0% by mass, and more preferably 0.03% by mass to 1.0% by mass, based on the total mass of the monomer components for preparing the acrylic polymer.

If the use amount of the polyfunctional monomer is more than 3.0% by mass based on the total mass of the monomer components for preparing the acrylic polymer, for example, the cohesive force of a pressure-sensitive adhesive composition may become too large, and the effect of suppressing the early pressure-sensitive adhesive force may be decreased. On the other hand, if the use amount thereof is less than 0.01% by mass, for example, the cohesive force of a pressure-sensitive adhesive composition may be decreased, and an increase in pressure-sensitive adhesive force occurring over time may become insufficient.

In preparing the acrylic polymer, the acrylic polymer can be easily formed by a curing reaction using heat or ultraviolet rays with the use of a polymerization initiator, such as a thermal polymerization initiator or a photo-polymerization initiator (photo-initiator). In particular, photo-polymerization can be preferably used from the advantage that a pressure-sensitive adhesive property is improved, etc. The polymerization initiators can be used alone or in combination of two or more thereof.

Examples of the thermal polymerization initiator include, for example, azo polymerization initiators (e.g., 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2-amidinopropane)dihydrochloride, 2,2'-azobis[2-(5-methyl-2-imidazoline-2-yl) propane]dihydrochloride, 2,2'-azobis(2-methylpropionamidine)disulfate, and 2,2'-azobis (N,N'-dimethyleneisobutylamidine)dihydrochloride, etc.); peroxide polymerization initiators (e.g., dibenzoyl peroxide, t-butyl permaleate, and lauroyl peroxide, etc.); redox polymerization initiators; and the like.

The use amount of the thermal polymerization initiator is not particularly limited, but it is blended, for example, in an amount within the range of 0.01 parts by mass to 5 parts by mass, and preferably within the range of 0.05 parts by mass to 3 parts by mass, based on 100 parts by mass of the monomer components for preparing the acrylic polymer.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specifically, examples of the benzoin ether photo-polymerization initiator include, for example, benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by BASF], anisoin, and the like. Examples of the acetophenone photo-polymerization initiator include, for example, 1-hydroxycyclohexyl phenyl ketone [product name: IRGACURE 184, made by BASF], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by BASF], 2-hydroxy-2-methyl-1-phenyl-propane-1-one [product name: DAROCUR 1173, made by BASF], methoxy acetophenone, and the like. Examples of the α-ketol photo-polymerization initiator include, for example, 2-methyl-2-hydroxy propiophenone, 1-[4-(2-hydroxyethyl)-phenyl]-2-hydroxy-2-methylpropane-1-one, and the like. Examples of the aromatic sulfonyl chloride photo-polymerization initiator include, for example, 2-naphthalene sulfonyl chloride, and the like. Examples of the photoactive oxime photo-polymerization initiator include, for example, 1-phenyl-1,2-propanedione-2-(o-ethoxycarbonyl)-oxime, and the like.

Examples of the benzoin photo-polymerization initiator include, for example, benzoin, and the like. Examples of the benzyl photo-polymerization initiator include, for example, benzyl, and the like. Examples of the benzophenone photo-polymerization initiators include, for example, benzophenone, benzoylbenzoic acid, 3,3'-dimethyl-4-methoxybenzophenone, polyvinyl benzophenone, α-hydroxy cyclohexyl phenyl ketone, and the like. Examples of the ketal photo-polymerization initiator include, for example, benzyldimethylketal, and the like. Examples of the thioxanthone photo-polymerization initiator include, for example, thioxanthone, 2-chlorothioxanthone, 2-methyl thioxanthone, 2,4-dimethylthioxanthone, isopropyl thioxanthone, 2,4-dichloro thioxanthone, 2,4-diethylthioxanthone, isopropyl thioxanthone, 2,4-diisopropyl thioxanthone, dodecyl thioxanthone, and the like.

Examples of the acylphosphine photo-polymerization initiator include, for example, bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl) phosphine oxide, bis(2,6-dimethoxybenzoyl)-t-butylphosphine oxide, bis(2,6-dimethoxybenzoyl)cyclohexylphosphine oxide, bis (2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl) phosphine oxide, bis(2,6-diethoxybenzoyl)(1-methylpropane-1-yl)phosphine oxide, bis(2,6-dibutoxybenzoyl)(2-methylpropane-1-yl)phosphine oxide, bis(2,4-dimethoxybenzoyl)(2-methypropane-1-yl)phosphine oxide, bis(2,4,6-trimethylbenzoyl)(2,4-dipentoxyphenyl) phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphin e oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, tri(2-methylbenzoyl)phosphine oxide, and the like.

The use amount of the photo-polymerization initiator is not particularly limited, but it is blended, for example, in an amount within the range of 0.01 parts by mass to 5 parts by mass, and preferably within the range of 0.05 parts by mass to 3 parts by mass, based on 100 parts by mass of the monomer components for preparing the acrylic polymer.

If the use amount of the photo-polymerization initiator is less than 0.01 parts by mass, a polymerization reaction may become insufficient. If the use amount thereof is more than 5 parts by mass, an ultraviolet ray may not reach the inside of the pressure-sensitive adhesive layer, because the photo-polymerization initiator absorbs an ultraviolet ray. In this case, a rate of polymerization is decreased, or the molecular weight of the generated polymer becomes small. Thereby, the cohesive force of the pressure-sensitive adhesive layer formed may become small, and an increase in pressure-sensitive adhesive force occurring over time may become insufficient. The photo-polymerization initiators can be used alone or in combination of two or more thereof.

In the present embodiment, the polymer (A) can also be prepared as a partial polymer (acrylic polymer syrup) whose monomer components are partially polymerized by irradiating a mixture, in which the monomer components and the polymerization initiator have been blended, with ultraviolet (UV) rays. The polymerization of the acrylic polymer syrup can be completed by blending the later-described polymer (B) into the syrup to prepare a pressure-sensitive adhesive composition and then by coating the pressure-sensitive adhesive composition on a predetermined object to be coated followed by irradiation with ultraviolet rays. That is, the acrylic polymer syrup is a precursor of the polymer (A), and accordingly a composition, in which the polymer (B) has been blended into the acrylic polymer syrup, also corresponds to the pressure-sensitive adhesive composition of the present embodiment.

[Polymer (B)]

The polymer (B) contains, as monomer units, one of monomers (B1) having a functional group equivalent of 1000 g/mol or more but less than 15000 g/mol and having a polyorganosiloxane backbone and one of monomers (B2) having a glass transition temperature of 40° C. or higher.

The monomer (B1) having a polyorganosiloxane backbone that forms the polymer (B) is not particularly limited, but any polyorganosiloxane backbone-containing monomer can be used. Uneven distribution of the polymer (B) to the surface of an adherend is actively promoted by the low polarity of the polyorganosiloxane backbone-containing monomer, the low polarity being generated due to the structure of the monomer, thereby allowing easy peelability to be exhibited at the beginning of attachment.

As a specific example of the polyorganosiloxane backbone-containing monomer, for example, a polyorganosiloxane backbone-containing monomer represented by the following general formula (1) or (2) can be used. More specifically, one-terminal reactive silicone oil made by Shin-Etsu Chemical Co., Ltd., such as X-22-174ASX, X-22-174DX, X-22-2426, and X-22-2475, can be cited, which can be used alone or in combination of two or more thereof.

[Chemical Formula 4]

(1)

[Chemical Formula 5]

(2)

[In the formulae (1) and (2), $R^3$ is hydrogen or methyl, $R^4$ is methyl or a monovalent organic group, and m and n are integers of 0 or more.]

The functional group equivalent of the monomer (B1) having a polyorganosiloxane backbone, which forms the polymer (B), is 1000 g/mol or more but less than 15000 g/mol. If the functional group equivalent of the monomer (B1) having a polyorganosiloxane backbone is less than 1000 g/mol, easy peelability is not exhibited, and pressure-sensitive adhesive force may not be reduced at the beginning of attachment. Conversely, if the functional group equivalent of the monomer having a polyorganosiloxane backbone is 15000 g/mol or more, the compatibility with the polymer (A) is remarkably deteriorated, and pressure-sensitive adhesive force may not be reduced at the beginning of attachment to an adherend or a property of increasing pressure-sensitive adhesive force over time may be inferior.

Herein, the "functional group equivalent" means the mass of a main backbone (e.g., polydimethylsiloxane) bound to one functional group. The indicated unit of g/mol is obtained by converting into 1 mol of functional groups. The functional group equivalent of a monomer having a polyorganosiloxane backbone is calculated, for example, from spectral intensities of $^1$H-NMR (proton NMR) obtained by a nuclear magnetic resonance (NMR) measuring apparatus.

In $^1$H-NMR, the ratio of the spectral intensity of H bound to Si in a siloxane structure via C (e.g., H in Si—$(CH_3)_2$) to the spectral intensity of H in a functional group (C—$CH_3$, SH, or C=$CH_2$) is calculated.

When a case is described, as an example, in which the ratio of the spectral intensity of H in Si—$(CH_3)_2$, which is a siloxane structure, to the spectral intensity ratio of H in C=$CH_2$, which is a functional group, is calculated, the ratio of the number of Si—$(CH_3)_2$, which is a siloxane structure, to the number of C=$CH_2$, which is a functional group, the Si—$(CH_3)_2$ and C=$CH_2$ being contained in a measurement sample, is known from the spectral intensity ratio.

Because the chemical formulae of the siloxane structure and the functional group are known in advance, the ratio (A/B) of the number (A) of siloxane structures each having a Si—$(CH_3)_2$ bonding to the number (B) of the functional groups, the siloxane structures and the functional groups being contained in the measurement sample, is known from the ratio of the number of Si—$(CH_3)_2$, which is the siloxane structure, and the number of C=$CH_2$, which is the functional group.

Because the molecular weight of per one siloxane structure having an Si—$(CH_3)_2$ bonding (herein dimethylsiloxane) is known, the value obtained by multiplying the aforementioned molecular weight by the ratio (A/B) of the number A of the siloxane structures to the number of the functional groups becomes the mass of the siloxane structure having an Si—$(CH_3)_2$ bonding per a functional group, i.e., the mass of a main backbone, and the value obtained by multiplying the mass thereof by Avogadro's number becomes a functional group equivalent (g/mol).

When two or more monomers, each having a functional group equivalent different from those of the others and having a polyorganosiloxane backbone, are used, the arithmetic mean value of the functional group equivalents can be used as the functional group equivalent of the monomers. That is, the functional group equivalent can be calculated from the following equation.

The functional group equivalent of a monomer mixture (g/mol)=(the functional group equivalent of monomer 1×the blending amount thereof+the functional group equivalent of monomer 2×the blending amount thereof+ . . . +the functional group equivalent of monomer n×the blending amount thereof)/(the blending amount of monomer 1+the blending amount of monomer 2+ . . . +the blending amount of monomer n). The content of the monomer (B1), having a functional group equivalent of 1000 g/mol or more but less than 15000 g/mol and having a polyorganosiloxane backbone, is 5% by mass or more but 50% by mass or less, preferably 10% by mass or more but 40% by mass or less, and more preferably 15% by mass or more but 30% by mass or less, based on the mass of the total monomer components of the polymer (B). If the content thereof is less than 5% by mass, adhesive force may not be reduced at the beginning of attachment. On the other hand, if the content is more than 50% by mass, pressure-sensitive adhesive force may not be reduced at the beginning of attachment or a property of increasing pressure-sensitive adhesive force over time may be inferior.

Examples of the monomer (B2), which forms the polymer (B) and has a glass transition temperature of 40° C. or higher, include, for example, (meth)acrylic monomers, such as dicyclopentanyl methacrylate (Tg: 175° C.), dicyclopentanyl acrylate (Tg: 120° C.), isobornyl methacrylate (Tg: 173° C.), isobornyl acrylate (Tg: 97° C.), methyl methacrylate (Tg: 105° C.), 1-adamantyl methacrylate (Tg: 250° C.), and 1-adamantyl acrylate (Tg: 153° C.). The homopolymer formed of the monomer (B2) preferably has a glass transition temperature of 80° C. or higher, and more preferably has a glass transition temperature of 100° C. or higher.

The polymer (B) may be a copolymer of the aforementioned (meth)acrylic monomer and the following monomer (however, the glass transition temperature of the homopolymer is 40° C. or higher). Examples of the monomer copolymerizable with the (meth)acrylic monomer include: amide group-containing vinyl monomers, such as acryloyl morpholine (Tg: 145° C.), dimethylacrylamide (Tg: 119° C.), diethylacrylamide (Tg: 81° C.), dimethylaminopropylacrylamide (Tg: 134° C.), isopropylacrylamide (Tg: 134° C.), and hydroxyethyl acrylamide (Tg: 98° C.); lactam monomers, such as N-vinyl caprolactams including N-vinyl-2-caprolactam, and the like; and the like.

The content of the monomer (B2) having a glass transition temperature of 40° C. or higher is preferably 10% by mass or more but 80% by mass or less, more preferably 20% by mass or more but 60% by mass or less, and still more preferably 30% by mass or more but 50% by mass or less, based on the mass of the total monomer components of the polymer (B). If the content is less than 10% by mass, pressure-sensitive adhesive force may not be reduced at the beginning of attachment. On the other hand, if the content is more than 80% by mass, a property of increasing pressure-sensitive adhesive force over time may be inferior.

Pressure-sensitive adhesive force, occurring at the beginning of attachment, can be suppressed and pressure-sensitive adhesive force can be increased over time with a (meth)acrylic monomer having a glass transition temperature of 40° C. or higher being contained in the polymer (B). Additionally, the polymer (B) may contain a (meth)acrylic monomer having a glass transition temperature lower than 80° C. Examples of the (meth)acrylic monomer having a glass transition temperature of lower than 80° C. include, for example, butyl methacrylate (Tg: 20° C.), 2-ethylhexyl methacrylate (Tg:−10° C.), and the like.

The polymer (B) may be a copolymer containing the monomer having a polyorganosiloxane backbone, the (meth)acrylic monomer having a glass transition temperature of 40° C. or higher, and one or more monomers selected from the group consisting of a (meth)acrylic monomer having an alicyclic structure, a monomer having a polyoxyalkylene backbone, a (meth)acrylic acid ester monomer, and a copolymerizable monomer.

Examples of such a (meth)acrylic acid ester monomer include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; (meth)acrylic acid aryl esters, such as (meth)acrylic acid phenyl and (meth)acrylic acid benzyl; (meth)acrylic acid esters obtained from terpene compound derivative alcohols; and the like. These (meth)acrylic acid esters can be used alone or in combination of two or more thereof.

The polymer (B) can also be obtained by copolymerizing, other than the (meth)acrylic acid ester component unit, another monomer component (copolymerizable monomer) copolymerizable with the (meth)acrylic acid ester. For example, a functional group that is reactive with an epoxy group or an isocyanate group may be introduced into the polymer (B). Examples of such a functional group include a hydroxyl group, carboxyl group, amino group, amide group, and mercapto group, and a monomer having such a functional group may be used (copolymerized) in producing the polymer (B).

Examples of the another monomer copolymerizable with the (meth)acrylic acid ester include: carboxyl group-containing monomers, such as acrylic acid, methacrylic acid, carboxy ethyl acrylate, carboxypentyl acrylate, itaconic acid, maleic acid, fumaric acid, crotonic acid, and isocrotonic acid; (meth)acrylic acid alkoxy alkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly)oxyalkylene, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, and adducts between lactones and (meth)acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl(meth)acrylamide, N-butyl(meth)acrylamide, N,N-diethyl(meth)acrylamide, N,N-dimethyl(meth)acrylamide, N-methylol(meth)acrylamide, N-ethylol(meth)acrylamide, N-methylolpropane(meth)acrylamide, N-methoxyethyl(meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-laurylmaleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyanoacrylate monomers, such as (meth)acrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl (meth)acrylate; organic silicon-containing vinyl monomers, such as vinyltrimethoxysilane, γ-methacryloxpropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxy lauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macromonomers having a radically polymerizable vinyl group at the monomer end to which a vinyl group has been polymerized, etc. These monomers can be copolymerized, alone or in combination thereof, with the (meth)acrylic acid esters.

In the polymer (B), the content of other monomer components, other than the monomer (B1) having a polyorganosiloxane backbone and the (meth)acrylic monomer (B2) having a glass transition temperature of 40° C. or higher, is preferably 0% by mass or more but 85% by mass or less, more preferably 0% by mass or more but 70% by mass or less, and still more preferably 20% by mass or more but 55% by mass or less, based on the mass of the total monomer components of the polymer (B).

The weight average molecular weight of the polymer (B) is 10000 or more but less than 100000, preferably 12000 or more but less than 50000, and more preferably 15000 or more but less than 30000. If the weight average molecular weight of the polymer (B) is 100000 or more, pressure-sensitive adhesive force occurring at the beginning of attachment is not reduced. If the weight average molecular weight is less than 10000, it becomes too low, and hence the pressure-sensitive adhesive force of a pressure-sensitive adhesive sheet may not be increased over time.

The weight average molecular weights of the polymer (A) and the polymer (B) can be determined by a gel permeation chromatography (GPC) method and by polystyrene conversion. Specifically, the measurement is performed in accordance with the method and conditions described in the later-described Examples.

The polymer (B) can be produced by polymerizing the aforementioned monomer with the use, for example, of a solution polymerization method, bulk polymerization method, emulsion polymerization method, suspension polymerization, block polymerization, or the like.

In order to adjust the molecular weight of the polymer (B), a chain transfer agent can be used during the polymerization. Examples of the chain transfer agent to be used include: compounds having a mercapto group, such as octylmercaptan, laurylmercaptan, t-nonyl mercaptan, t-dodecyl mercaptan, mercaptoethanol, and α-thioglycerol; thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, and thioglycolic acid esters including thioglycolic acid ester of ethylene glycol, thioglycolic acid ester of neopentyl glycol, and thioglycolic acid ester of pentaerythritol, etc.; α-methylstyrene dimer; and the like.

The use amount of the chain transfer agent is not particularly limited, but is contained in an amount of usually 0.05 parts by mass to 20 parts by mass, preferably 0.1 parts by mass to 15 parts by mass, and more preferably 0.2 parts by mass to 10 parts by mass, based on 100 parts by mass of the monomer. By thus adjusting the addition amount of the chain transfer agent, the (meth)acrylic polymer (B) having a preferred molecular weight can be obtained. The chain transfer agents can be used alone or in combination of two or more thereof.

[Pressure-Sensitive Adhesive Composition]

The pressure-sensitive adhesive composition includes the aforementioned polymer (A) and the polymer (B) as essential components. The content of the polymer (B) is 0.1 parts by mass or more but 20 parts by mass or less, preferably 0.3 parts by mass to 17 parts by mass, more preferably 0.4 parts by mass to 15 parts by mass, and still more preferably 0.5 parts by mass to 12 parts by mass, based on 100 parts by mass of the polymer (A). If the polymer (B) is added in an amount more than 20 parts by mass, the pressure-sensitive adhesive force of a pressure-sensitive adhesive layer formed by the pressure-sensitive adhesive composition according to the present embodiment is decreased over time. On the other hand, if the addition amount of the polymer (B) is less than 0.1 parts by mass, the effect of suppressing the pressure-sensitive adhesive force occurring when an adherend is attached may be small, and a failure may occur, in which rework cannot be performed.

The pressure-sensitive adhesive composition may contain, other than the aforementioned polymer (A) and polymer (B), various types of additives that are common in the field of pressure-sensitive adhesive compositions, as optional components. Such optional components are exemplified by a tackifying resin, cross-linking agent, catalyst, plasticizer, softener, filler, colorant (pigment, dye, or the like), antioxidant, leveling agent, stabilizer, antiseptic, antistatic agent, and the like. Such additives that are conventionally and publicly known can be used by ordinary methods.

In order to adjust the cohesive force of the later-described pressure-sensitive adhesive layer, a cross-linking agent can also be used other than the aforementioned various monomers. Normally-used cross-linking agents can be used as the cross-linking agent, and examples thereof include, for example, an epoxy cross-linking agent, isocyanate cross-linking agent, silicone cross-linking agent, oxazoline cross-linking agent, aziridine cross-linking agent, silane cross-linking agent, alkyl-etherified melamine cross-linking agent, metal chelate cross-linking agent, and the like. In particular, an isocyanate cross-linking agent, epoxy cross-linking agent, and metal chelate cross-linking agent can be preferably used. These compounds may be used alone or in is combination of two or more thereof.

Specifically, examples of the isocyanate cross-linking agent include tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and adducts of these compounds with polyols such as trimethylolpropane. Alternatively, a compound having, in one molecule, at least one isocyanate group and one or more unsaturated bonds, specifically 2-isocyanate ethyl(meth)acrylate, etc., can also be used as the isocyanate cross-linking agent. These compounds may be used alone or in combination of two or more thereof.

Examples of the epoxy cross-linking agent include, bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, 1,3-bis(N,N-diglycidyl aminomethyl) cyclohexane, and the like. These compounds may be used alone or in combination of two or more thereof.

Examples of the metal chelate compound include: as metal components, aluminum, iron, tin, titanium, and nickel; and as chelate components, acetylene, methyl acetoacetate, ethyl lactate, and the like. These compounds may be used alone or in combination of two or more thereof.

The cross-linking agent is preferably contained in an amount of 0.01 parts by mass to 15 parts by mass, and more preferably contained in an amount of 0.5 parts by mass to 10 parts by mass, based on 100 parts by mass of the polymer (A). If the content thereof is less than 0.01 parts by mass, the cohesive force of a pressure-sensitive adhesive composition may become small, and hence adhesion reliability may be inferior. On the other hand, if the content is more than 15 parts by mass, the cohesive force of a pressure-sensitive adhesive composition may become large and the flow property thereof may become poor, and hence an increase in pressure-sensitive adhesive force occurring over time may be inferior.

The pressure-sensitive adhesive composition disclosed herein may further contain a cross-linking catalyst for more effectively promoting any one of the aforementioned cross-linking reactions. As such a cross-linking catalyst, for example, a tin catalyst (in particular, dioctyl tin dilaurate) can be preferably used. The use amount of the cross-linking catalyst (e.g., a tin catalyst such as dioctyl tin dilaurate) is not particularly limited, but the use amount may be, for example, approximately 0.0001 parts by mass to 1 part by mass, based on 100 parts by mass of the polymer (A).

The tackifying resin is not particularly limited, and examples thereof include, for example, a rosin tackifying resin, terpene tackifying resin, phenol tackifying resin, hydrocarbon tackifying resin, ketone tackifying resin, polyamide tackifying resin, epoxy tackifying resin, elastomer tackifying resin, and the like. Examples of the rosin tackifying resin include, for example: unmodified rosins (raw rosins), such as gum rosin, wood rosin, and tall oil rosin; modified rosins obtained by modifying these unmodified rosins with polymerization, disproportionation, hydrogenation, or the like (polymerized rosin, stabilized rosin, disproportionated rosin, completely hydrogenated rosin, partially hydrogenated rosin, and chemically modified other rosins, etc.); and various rosin derivatives.

Examples of the rosin derivatives include, for example: rosin phenol resins obtained by adding phenol to rosins (unmodified rosins, modified rosins, and various rosin derivatives, etc.) with an acid catalyst followed by being subjected to thermal polymerization; rosin ester resins, such as rosin ester compounds (unmodified rosin esters) obtained by esterifying unmodified rosins with alcohols, and modified rosin ester compounds (such as polymerized rosin ester, stabilized rosin ester, disproportionated rosin ester, completely hydrogenated rosin ester, and partially hydrogenated rosin ester) obtained by esterifying modified rosins (such as polymerized rosin, stabilized rosin, disproportionated rosin, completely hydrogenated rosin, and partially hydrogenated rosin) with alcohols; unsaturated fatty acid-modified rosin resins obtained by modifying unmodified rosins or modified rosins (such as polymerized rosin, stabilized rosin, disproportionated rosin, completely hydrogenated rosin, and partially hydrogenated rosin) with an unsaturated fatty acid; unsaturated fatty acid-modified rosin ester resins obtained by modifying rosin ester resins with an unsaturated fatty acid; rosin alcohol resins obtained by subjecting carboxyl groups in unmodified rosins, modified rosins (such as polymerized rosin, stabilized rosin, disproportionated rosin, completely hydrogenated rosin, and partially hydrogenated rosin), unsaturated fatty acid-modified rosin resins, or unsaturated fatty acid-modified rosin esters to a reduction treatment; metal salts of rosin resins (in particular, rosin ester resins), such as unmodified rosins, modified rosins, and various rosin derivatives; and the like.

Examples of the terpene tackifying resin include, for example: terpene resins, such as an α-pinene polymer, β-pinene polymer, and dipentene polymer; modified terpene resins (e.g., a terpene phenol resin, styrene modified terpene resin, aromatic modified terpene resin, and hydrogenated terpene resin, etc.) obtained by modifying (phenol modification, aromatic modification, hydrogenation modification, and hydrocarbon modification, etc.) these terpene resins; and the like.

Examples of the phenol tackifying resin include, for example: condensates (e.g., an alkylphenol resin and xyleneformaldehyde resin, etc.) of various phenols (e.g., phenol, m-cresol, 3,5-xylenol, p-alkylphenol, and resorcinol, etc.) and formaldehydes; resols obtained by subjecting the phenols and the formaldehydes to an addition reaction with an alkali catalyst; novolacs obtained by subjecting the phenols and the formaldehydes to a condensation reaction with an acid catalyst; and the like.

Examples of the hydrocarbon tackifying resin (petroleum tackifying resin) include, for example: aliphatic hydrocarbon resins [polymers of aliphatic hydrocarbons, such as $C_{4-5}$ olefins and dienes (olefins such as butene-1, isobutylene, and pentene-1; and dienes such as butadiene, 1,3-pentadiene, and isoprene)]; aliphatic cyclic hydrocarbon resins [alicyclic hydrocarbon resins obtained by subjecting a so-called "C4 petroleum fraction" or "C5 petroleum fraction" to cyclization/dimerization followed by being subjected to polymerization; polymers of cyclic diene compounds (cyclopentadiene, dicyclopentadiene, ethylidene norbornene, and dipentene, etc.) or hydrogenated compounds thereof; and alicyclic hydrocarbon resins obtained by hydrogenating the aromatic ring of the following aromatic hydrocarbon resins and aliphatic and aromatic petroleum resins]; aromatic hydrocarbon resins [polymers of $C_{8-10}$ vinyl group-containing aromatic hydrocarbons (styrene, vinyl toluene, α-methylstyrene, indene, and methylindene, etc.)]; aliphatic and aromatic petroleum resins (styrene-olefin copolymers, etc.); aliphatic and alicyclic petroleum resins; hydrogenated hydrocarbon resins; cumarone resins; cumarone indene resins; and the like.

Commercially available products of the polymerized rosin ester, which can be preferably used, are exemplified by the products with the names of "PENSEL D-125", "PENSEL D-135", "PENSEL D-160", "PENSEL KK", and "PENSEL C", etc., which are all made by ARAKAWA CHEMICAL INDUSTRIES, LTD., but are not limited thereto.

Commercially available products of the terpene phenol resin, which can be preferably used, are exemplified by the products: with the names of "YS Polystar S-145", "YS Polystar G-125", "YS Polystar N125", and "YS Polystar U-115", which are all made by YASUHARA CHEMICAL CO., LTD.; with the names of "TAMANOL 803L" and "TAMANOL 901", which are all made by ARAKAWA CHEMICAL INDUSTRIES, LTD.; with the name of "SUMILITE RESIN PR-12603" made by SUMITOMO BAKELITE CO., LTD.; and the like, but are not limited thereto.

[Pressure-Sensitive Adhesive Layer and Pressure-Sensitive Adhesive Sheet]

Subsequently, the structure of a pressure-sensitive adhesive sheet, having a pressure-sensitive adhesive layer including a pressure-sensitive adhesive composition having the aforementioned composition, will be described.

The pressure-sensitive adhesive layer can be a cured layer of a pressure-sensitive adhesive composition. That is, the pressure-sensitive adhesive layer can be formed by providing the pressure-sensitive adhesive composition to an appropriate supporting body (e.g., application or coating) and then by properly performing a curing treatment. When two or more types of curing treatments (drying, cross-linking, polymerization, etc.) are performed, these treatments can be performed simultaneously or in multiple stages. In the case of the pressure-sensitive adhesive composition using a partial polymer (acrylic polymer syrup), a final copolymerization reaction is typically performed as the curing treatment (the partial polymer is subjected to a further copolymerization reaction to form a complete polymer). For example, when a photo-curable pressure-sensitive adhesive composition is used, light irradiation is performed. A curing treatment, such as cross-linking or drying, may be performed, if necessary. For example, when a photo-curing pressure-sensitive adhesive composition is required to be dried, it is good to perform light curing after drying. In the case of a pressure-sensitive adhesive composition using a complete polymer, a treatment, such as drying (drying by heating) or cross-linking, is typically performed as the curing treatment, if necessary.

The application or coating of the pressure-sensitive adhesive composition can be performed by using a commonly-used coater, such as, for example, a gravure roll coater, reverse roll coater, kiss-roll coater, dip roll coater, bar coater, knife coater, or spray coater. Alternatively, the pressure-sensitive adhesive layer may be formed by directly providing the pressure-sensitive adhesive composition to a supporting body, or the pressure-sensitive adhesive layer formed on a release liner may be transferred to a supporting body.

The storage modulus at 23° C. of the aforementioned pressure-sensitive adhesive layer, which is measured by dynamic viscoelasticity measurement under a condition of shear strain at a frequency of 1 Hz, is preferably $1 \times 10^6$ Pa or less, more preferably $1 \times 10^4$ to $8 \times 10^5$ Pa, and still more preferably $2 \times 10^4$ to $6 \times 10^5$ Pa. If the storage modulus is more than $1 \times 10^6$, there is a failure in which the adhesiveness to a rough surface becomes deteriorated.

It is desirable that the ratio of a solvent-insoluble component in the pressure-sensitive adhesive layer is within the range of 15.0% by mass to 99.0% by mass, and preferably within the range of 20.0% by mass to 95.0% by mass. If the ratio of a solvent-insoluble component is less than 15.0% by mass, cohesive force may become insufficient and adhesion reliability may be inferior; conversely if the ratio thereof is more than 99.0% by mass, cohesive force may become too large and an increase in pressure-sensitive adhesive force occurring over time may be insufficient. A method of evaluating the ratio of a solvent-insoluble component will be described later.

The thickness of the pressure-sensitive adhesive layer is not particularly limited, but when the pressure-sensitive adhesive layer is laminated only on one side of a supporting body, good adhesiveness can be achieved by causing, for example, the thickness to be 2 μm to 400 μm, preferably 3 μm to 200 μm, and more preferably 5 μm to 150 μm. When the pressure-sensitive adhesive layers are laminated on both the sides of a supporting body, good adhesiveness can be achieved by causing the thickness of each pressure-sensitive adhesive layer to be 1 μm to 200 μm, preferably 3 μm to 200 μm, and more preferably 5 μm to 150 μm. When the pressure-sensitive adhesive layers are laminated on both the sides of a supporting body, the thicknesses of both the pressure-sensitive adhesive layers may be the same or different. If the thickness of the pressure-sensitive adhesive layer is less than 1 μm, an increase in the pressure-sensitive adhesive force occurring over time may be inferior; conversely if the thickness thereof is more than 400 μm, the effect of suppressing the pressure-sensitive adhesive force occurring immediately after attachment may become insufficient.

Figure 1:
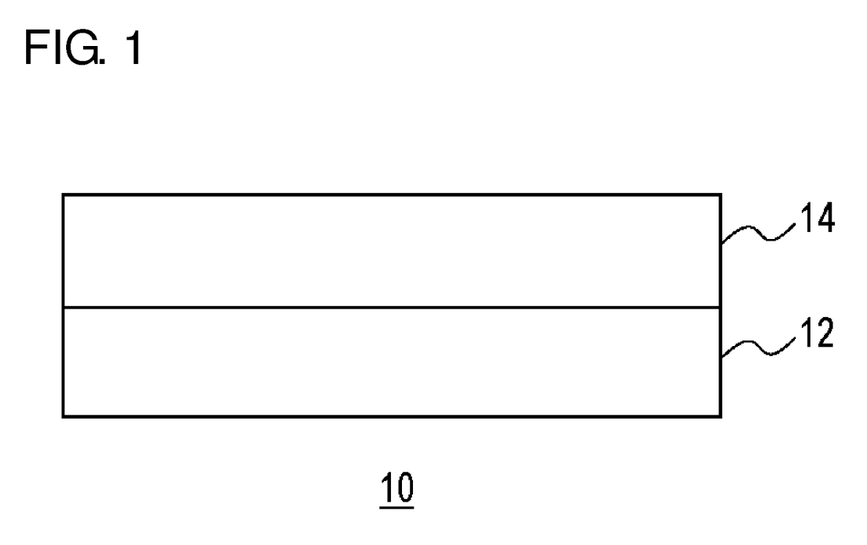
FIG. 1 is a side view of a pressure-sensitive adhesive sheet according to the present embodiment.

FIG. 1 is a side view of a pressure-sensitive adhesive sheet 10 according to the present embodiment. The pressure-sensitive adhesive sheet 10 illustrated in FIG. 1 includes a supporting body 12 and a pressure-sensitive adhesive layer 14 that is laminated on one side of the supporting body 12 and is composed of a pressure-sensitive adhesive composition. In the pressure-sensitive adhesive sheet 10, such a pressure-sensitive adhesive layer is provided on at least one surface of the supporting body 12 in a fixed manner, i.e., without the intention of separating the pressure-sensitive adhesive layer 14 from the supporting body 12. The concept of the pressure-sensitive adhesive sheet described herein can involve objects referred to as a pressure-sensitive adhesive tape, a pressure-sensitive adhesive film, a pressure-sensitive adhesive label, and the like. The pressure-sensitive adhesive sheet may be one cut or punched into an appropriate shape in accordance with its purpose of use. The pressure-sensitive adhesive layer is not limited to a continuously-formed layer, but may be a pressure-sensitive adhesive layer formed into a regular or random pattern, such as, for example, a dot-shaped pattern or a stripe-shaped pattern.

Examples of the aforementioned supporting body (substrate) include, for example: plastic films, such as polyolefin films including polyethylene, polypropylene, poly-1-butene, poly-4-methyl-1-pentene, ethylene propylene copolymer, ethylene 1-butene copolymer, ethylene vinyl acetate copolymer, ethylene ethyl acrylate copolymer, and ethylene vinyl alcohol copolymer, polyester films including polyethylene terephthalate, polyethylene naphthalate, polybutylene terephthalate, and the like, polyacrylate film, polystyrene film, polyamide films including nylon 6, nylon 6, 6, partially aromatic polyamide, and the like, polyvinylchloride film, polyvinylidene chloride film, and polycarbonate film; foam substrates, such as a polyurethane foam and polyethylene foam; paper, such as craft paper, crepe paper, and Japanese paper; cloth, such as cotton cloth and staple fiber cloth; nonwoven cloth, such as polyester nonwoven cloth and vinylon nonwoven cloth; metallic foils, such as aluminum foil and copper foil; and the like, which can be appropriately selected and used in accordance with the use of the pressure-sensitive adhesive tape.

The supporting body can also be subjected to, if necessary: a mold-release and antifouling treatment using a release agent, such as a silicone release agent, fluorine release agent, long-chain alkyl release agent, or fatty acid amide release agent, and a silica powder; and an easy-adhesion treatment, such as an acid treatment, alkali treatment, primer treatment, corona treatment, plasma treatment, ultraviolet treatment, or the like. The thickness of the supporting body can be appropriately selected in accordance with a purpose, but in general the thickness thereof is approximately 1 µm to 200 µm. In the pressure-sensitive adhesive tape according to the present embodiment, it is preferable that the thickness of the supporting body (substrate) is approximately 1 µm to 100 µm.

The supporting body can also be subjected to, if necessary: a mold-release and antifouling treatment using a release agent, such as a silicone release agent, fluorine release agent, long-chain alkyl release agent, or fatty acid amide release agent, and a silica powder; an easy-adhesion treatment, such as an acid treatment, alkali treatment, primer treatment, corona treatment, plasma treatment, ultraviolet treatment, or the like; and an antistatic treatment, such as a coating type, kneading type, vapor deposition type, or the like.

In the pressure-sensitive adhesive sheet of the present embodiment, a release liner can be attached to the surface of the pressure-sensitive adhesive layer, if necessary, in order to protect the pressure-sensitive adhesive surface.

Paper or a plastic film can be used as a material for forming the release liner, but a plastic film is preferably used because it is excellent in surface smoothness. The film is not particularly limited, as far as it can protect the pressure-sensitive adhesive layer, and examples of the film include, for example: a polyethylene film, polypropylene film, polybutene film, polybutadiene film, polymethylpentene film, polyvinylchloride film, vinylchloride copolymer film, polyethylene terephthalate film, polybutylene terephthalate film, polyurethane film, ethylene-vinylacetate copolymer film, and the like.

The thickness of the release liner is usually within the range of 5 µm to 200 µm, and preferably within the range of approximately 10 µm to 100 µm. When the thickness is within the range, the release liner is excellent in workability for the attachment to the pressure-sensitive adhesive layer and for the peeling from the pressure-sensitive adhesive layer, which is preferable. The release liner can also be subjected to, if necessary: a mold-release and antifouling treatment using a release agent, such as a silicone release agent, fluorine release agent, long-chain alkyl release agent, or fatty acid amide release agent, and a silica powder; and an antistatic treatment, such as a coating type, kneading type, vapor deposition type, or the like.

The pressure-sensitive adhesive sheet has small pressure-sensitive adhesive force immediately after attachment to an adherend, and hence, even if a bubble is mixed in between the adherend and the pressure-sensitive adhesive sheet, the bubble can be easily extruded. Further, the pressure-sensitive adhesive sheet has the property that pressure-sensitive adhesive force is increased over time and adhesion reliability is high. The property of the pressure-sensitive adhesive sheet, occurring immediately after the sheet is attached (after the sheet is left at room temperature (23° C.) for 10 seconds or left at room temperature for 30 minutes), can be evaluated by a 180°-peeling pressure-sensitive adhesive force test in which the sheet is peeled at tensile speed of 300 mm/min and at a peeling angle of 180°. The 180°-peeling pressure-sensitive adhesive force test is performed in accordance with the method and conditions described in the later-described Examples.

Pressure-sensitive adhesive force N1, occurring after the pressure-sensitive adhesive sheet is attached and left at 23° C. for 10 seconds (condition immediately after attachment), is 1.0 [N/20 mm] or less, preferably 0.7 [N/20 mm], and more preferably 0.3 [N/20 mm]. If the pressure-sensitive adhesive force N1, occurring immediately after attachment, is more than 1.0 [N/20 mm], there is the problem that a bubble, mixed in between an adherend and the pressure-sensitive adhesive layer, is not likely to be released.

The pressure-sensitive adhesive force, occurring after the aging of the pressure-sensitive adhesive sheet, can be evaluated by a 180°-peeling pressure-sensitive adhesive force test in which the sheet is left at 80° C. for 5 minutes and then is peeled at tensile speed of 300 mm/min and at a peeling angle of 180°. The 180°-peeling pressure-sensitive adhesive force test is performed in accordance with the method and conditions described in the later-described Examples.

Pressure-sensitive adhesive force N2, occurring after the aging of the pressure-sensitive adhesive sheet, is 3.0 [N/20 mm] or more, preferably 4.0 [N/20 mm], and more preferably 5.0 [N/20 mm]. If the pressure-sensitive adhesive force N2, occurring after aging, is less than 3.0 [N/20 mm], an adherend cannot be firmly fixed.

The pressure-sensitive adhesive sheet according to the present embodiment is configured such that the ratio N2/N1 of the pressure-sensitive adhesive force N1, occurring after the pressure-sensitive adhesive layer is attached to a stainless steel plate (430 BA plate) and is left for 10 seconds, to the pressure-sensitive adhesive force N2, occurring after the sheet is attached and is aged at 80° C. for 5 minutes, becomes 5.0 or more, preferably 10.0 or more, and more preferably 20.0 or more. If N2/N1 is less than 5.0, the sheet cannot be firmly attached to an adherend.

Further, the pressure-sensitive adhesive sheet has the property that the bubble, mixed in when the sheet is attached to an adherend, can be easily released. The bubble releasing property of a pressure-sensitive adhesive sheet is evaluated in accordance with the method and conditions described in the later-described Examples.

The pressure-sensitive adhesive sheet of the present embodiment has the property that: at the beginning of attachment to an adherend, the sheet has pressure-sensitive adhesive force small to a degree at which rework can be performed; and thereafter the sheet is firmly attached to an adherend. In addition to the property, the pressure-sensitive adhesive sheet of the embodiment has the characteristic that, even if a bubble is mixed in between the sheet and an adherend at the beginning of the attachment to the adherend, the bubble that has been mixed in can be easily released. Accordingly, the pressure-sensitive adhesive sheet can be preferably used: in optical applications in which optical films to be used in image display apparatuses, such as a liquid crystal display, plasma display, and organic EL display, are adhered, etc.; and also as materials for joining members in mobile devices and other electrical and electronic equipment, etc., or as materials for joining various members in automobiles and home electronic appliances, etc. In particular, when an adherend is formed by a brittle material, and the like, the adherend can be suppressed from being damaged when rework is performed. Examples of the brittle material include, for example, glass, thin-layer plastic, stretched plastic films in which molecules are oriented, thin-layer ceramics, black lead, graphite, and the like.

EXAMPLES

Hereinafter, examples of the present invention will be described, which do not intend to limit the scope of the invention at all, but are presented as exemplifications for preferably describing the invention.
(Preparation of Acrylic Polymer 1 (2EHA/AA=95/5) as (A) Component)

Ninety-five parts by mass of 2-ethylhexyl acrylate (2EHA), 5 parts by mass of acrylic acid (AA), and 200 parts by mass of ethyl acetate as a polymerization solvent were placed into a 4-neck flask provided with a stirring blade, a thermometer, a nitrogen gas inlet pipe, and a cooler. After they were stirred under a nitrogen atmosphere at 60° C. for 2 hours, 0.2 parts by mass of azobisisobutyronitrile were placed therein as a thermal polymerization initiator to react with them at 60° C. for 6 hours. The weight average molecular weight of the obtained polymer was 1,100,000.
(Preparation of Acrylic Polymer Syrup 2 (2EHA/AA=94/6) as (A) Component)

Ninety-four parts by mass of 2-ethylhexyl acrylate (2EHA), 6 parts by mass of acrylic acid (AA), 0.05 parts by mass of a photo-polymerization initiator (product name: IRGACURE 184, made by BASF), and 0.05 parts by mass of a photo-polymerization initiator (product name: IRGACURE 651, made by BASF) were placed into a 4-neck flask. A partial polymer (acrylic polymer syrup) having a polymerization rate of approximately 8% by mass was obtained by exposing the mixture to ultraviolet rays under a nitrogen atmosphere to be partially photo-polymerized.
(Preparation of (Meth)acrylic Polymer 1 (MMA/BMA/2EHMA/X-22-174ASX/X-22-174DX=40/20/20/17/3) as (B) Component)

One hundred parts by mass of toluene, 40 parts by mass of methyl methacrylates (MMA), 20 parts by mass of butyl methacrylate (BMA), 20 parts by mass of 2-ethylhexyl methacrylate (2-EHMA), 17 parts by mass of a polyorganosiloxane backbone-containing methacrylate monomer having a functional group equivalent of 900 g/mol (product name: X-22-174ASX, made by Shin-Etsu Chemical Co., Ltd.), 3 parts by mass of a polyorganosiloxane backbone-containing methacrylate monomer having a functional group equivalent of 4600 g/mol (product name: X-22-174DX, made by Shin-Etsu Chemical Co., Ltd.), and 0.51 parts by mass of methyl thioglycolate as a chain transfer agent were placed into a 4-neck flask provided with a stirring blade, thermometer, nitrogen gas inlet pipe, cooler, and dropping funnel. The mixture was stirred under a nitrogen atmosphere at 70° C. for 1 hour, and 0.2 parts by mass of azobisisobutyronitriles as a thermal polymerization initiator were then placed therein to react the mixture at 70° C. for 2 hours, and thereafter 0.1 parts by mass of azobisisobutyronitrile were placed therein as a thermal polymerization initiator, so that they were subsequently reacted together at 80° C. for 5 hours. The weight average molecular weight Mw of the obtained (meth)acrylic polymer 1 was 22800.
((Meth)Acrylic Polymer as Another (B) Component)

Each of (Meth)acrylic Polymers 2 to 8 was produced in the same way as (Meth)acrylic Polymer 1, except that a monomer composition, the type of a solvent, and the parts by mass of a chain transfer agent were added in the way listed in Table 1.

TABLE 1

| No. | Composition | Copolymerization Ratio | Functional Group Equivalent | Chain Transfer Agent (Methyl Thioglycolate) Parts by Mass | Solvent | Mw |
| --- | --- | --- | --- | --- | --- | --- |
| (Meta)Acrylic Polymer 1 | MMA/BMA/2EHMA/X22-174ASX/X22-174DX | 40/20/20/17/3 | 1460 | 0.51 | Toluene | 22800 |
| (Meta)Acrylic Polymer 2 | MMA/BMA/2EHMA/X22-174ASX/X22-174DX | 40/20/20/14/6 | 2010 | 0.51 | Toluene | 22400 |
| (Meta)Acrylic Polymer 3 | MMA/BMA/2EHMA/X22-174ASX/X22-174DX | 40/20/20/8.7/11.3 | 2990 | 0.51 | Toluene | 22500 |
| (Meta)Acrylic Polymer 4 | MMA/BMA/2EHMA/X22-174DX | 40/20/20/20 | 4600 | 0.51 | Toluene | 24100 |
| (Meta)Acrylic Polymer 5 | MMA/BMA/2EHMA/X22-174DX | 40/20/20/20 | 4600 | 0.45 | Toluene | 35600 |
| (Meta)Acrylic Polymer 6 | DCPMA/BMA/2EHMA/X22-174DX | 40/20/20/20 | 4600 | 0.51 | Toluene | 19000 |
| (Meta)Acrylic Polymer 7 | DCPMA/2EHMA/X22-174DX | 40/40/20 | 4600 | 0.51 | Toluene | 18200 |
| (Meta)Acrylic Polymer 8 | MMA/BMA/2EHMA/X22-174DX | 45/22.5/22.5/10 | 4600 | 0.53 | Toluene | 22200 |

The abbreviations listed in Table 1 are as follows.
MMA: Methyl Methacrylate, Tg 105° C.
BMA: Butyl Methacrylate, Tg 20° C.
2EHMA: 2-Ethylhexyl Methacrylate, Tg −10° C.
X-22-174ASX: Polyorganosiloxane Backbone-containing Methacrylate Monomer having a functional group equivalent of 900 g/mol, made by Shin-Etsu Chemical Co., Ltd.
X-22-174DX: Polyorganosiloxane Backbone-containing Methacrylate Monomer having a functional group equivalent of 4600 g/mol, made by Shin-Etsu Chemical Co., Ltd.

<Measurement of Molecular Weight>

The weight average molecular weight of a polymer was measured by using a GPC apparatus (made by TOSOH CORP., HLG-8220 GPC,). Measurement conditions are as follows and the molecular weight was determined by standard polystyrene conversion.

Sample concentration: 0.2 wt % (tetrahydrofuran (THF) solution)
Sample injection volume: 10 μl
Eluent: THF
Flow Rate: 0.6 ml/min
Measuring temperature: 40° C.
Column: Sample column; TSKguardcolumn SuperHZ-H (one column)+TSKgel SuperHZM-H (two columns)

Reference column; TSKgel SuperH-RC (one column)
Detector: differential refractometer (RI)

Example 1

Preparation of Pressure-Sensitive Adhesive Composition

A pressure-sensitive adhesive composition was prepared: by adding 5 parts by mass of the (meth)acrylic polymer 3 and 1 part by mass of CORONATE L (made by NIPPON POLYURETHANE INDUSTRY CO., LTD., a trimethylolpropane/tolylene diisocyanate trimer adduct) as a cross-linking agent to 500 parts by mass (100 parts by mass of Acrylic Polymer (A)) of a solution in which the aforementioned acrylic polymer 1 (35% by mass) was diluted to 20% by mass with ethyl acetate; and by stirring the mixture at 25° C. for 5 minutes.
(Production of Pressure-Sensitive Adhesive Sheet)

A pressure-sensitive adhesive layer having a thickness of 20 μm was formed: by coating the aforementioned pressure-sensitive adhesive composition on one surface of a polyester film having a thickness of 38 μm (product name: Diafoil MRF, made by Mitsubishi Plastics Inc.), the one surface having been subjected to a release treatment with silicone; and by heating the coated composition at 130° C. for 2 minutes. Then, the pressure-sensitive adhesive layer formed on the release liner was transferred to a supporting body having a thickness of 25 μm, thereby allowing a pressure-sensitive adhesive sheet (single-sided pressure-sensitive adhesive tape) having a total thickness of 45 μm to be created. Alternatively, a single-sided pressure-sensitive adhesive tape may be created by directly providing the pressure-sensitive adhesive composition to a supporting body.

Example 2

A pressure-sensitive adhesive composition was prepare: by adding 5 parts by mass of the (meth)acrylic polymer 3, 20 parts by mass of YS Polystar S-145 (made by YASUHARA CHEMICAL CO., LTD.) as a tackifying resin, and 1 part by mass of CORONATE L (made by NIPPON POLYURETHANE INDUSTRY CO., LTD., a trimethylolpropane/tolylene diisocyanate trimer adduct) as a cross-linking agent to 500 parts by mass (100 parts by mass of Acrylic Polymer (A)) of a solution in which the aforementioned acrylic polymer 1 (35% by mass) was diluted to 20% by mass with ethyl acetate; and by stirring the mixture at 25° C. for 5 minutes.
(Production of Pressure-Sensitive Adhesive Sheet)

A pressure-sensitive adhesive layer having a thickness of 20 μm was formed: by coating the aforementioned pressure-sensitive adhesive composition on one surface of a polyester film having a thickness of 38 μm (product name: Diafoil MRF, made by Mitsubishi Plastics Inc.), the one surface having been subjected to a release treatment with silicone; and by heating the coated composition at 130° C. for 2 minutes. Then, the pressure-sensitive adhesive layer formed on the release liner was transferred to a supporting body having a thickness of 25 μm, thereby allowing a pressure-sensitive adhesive sheet (single-sided pressure-sensitive adhesive tape) having a total thickness of 45 μm to be created. Alternatively, a single-sided pressure-sensitive adhesive tape may be created by directly providing the pressure-sensitive adhesive composition to a supporting body.

Example 3

A pressure-sensitive adhesive composition was prepared by almost the same method as in Example 1, except that a (meth)acrylic polymer 4 was used instead of the (meth)acrylic polymer 3 used in Example 1. Then, a pressure-sensitive adhesive sheet (single-sided pressure-sensitive adhesive tape) having a total thickness of 45 μm was created by the same method as in Example 1.

Example 4

A pressure-sensitive adhesive composition was prepared by almost the same method as in Example 2, except that the (meth)acrylic polymer 4 was used instead of the (meth)acrylic polymer 3 used in Example 2. Then, a pressure-sensitive adhesive sheet (single-sided pressure-sensitive adhesive tape) having a total thickness of 45 μm was created by the same method as in Example 2.

Example 5

Preparation of Pressure-Sensitive Adhesive Composition

A pressure-sensitive adhesive composition was prepared: by adding 4 parts by mass of the aforementioned (meth)acrylic polymer 3 and 0.07 parts by mass of trimethylolpropane triacrylate (TMPTA) as a cross-linking agent to 100 parts by mass of the aforementioned acrylic polymer syrup 2; and then by stirring them uniformly.
(Production of Pressure-Sensitive Adhesive Sheet)

A coated layer having a final thickness of 50 μm was formed by coating the aforementioned pressure-sensitive adhesive composition on one surface of a polyester film having a thickness of 38 μm (product name: Diafoil MRF, made by Mitsubishi Plastics Inc.), the one surface having been subjected to a release is treatment with silicone. Subsequently, the surface of the coated pressure-sensitive adhesive composition was covered with one surface of a polyester film having a thickness of 38 μm (product name: Diafoil MRE, made by Mitsubishi Plastics Inc.), the one surface having been subjected to a release treatment with silicone, so that the one surface of the film was located near to the coated layer. Thereby, oxygen was blocked from the coated layer of the pressure-sensitive adhesive composition (pressure-sensitive adhesive composition layer). The coated layer thus obtained was irradiated for 360 seconds with ultraviolet rays having an illuminance of 5 mW/cm² (measures by TOPCON UVR-T1 having maximum sensitivity at approximately 350 nm) by using a chemical light lamp (made by TOSHIBA CORPORATION) in order to be polymerized, thereby allowing a pressure-sensitive adhesive layer sheet to be obtained. The polyester films provided on both the surfaces of the pressure-sensitive adhesive layer sheet function as a release liner.

Then, a pressure-sensitive adhesive sheet (single-sided pressure-sensitive adhesive tape) having a total thickness of 75 μm was created by peeling the release liner provided on one side and then by transferring the pressure-sensitive adhesive layer formed on the release liner on the other side to a supporting body having a thickness of 50 μm.

Example 6

A pressure-sensitive adhesive composition having a thickness of 4 μm was prepared by the same method as in Example 1. Then, a pressure-sensitive adhesive sheet (double-sided pressure-sensitive adhesive tape) having a total thickness of 10 μm was created by transferring the pressure-sensitive adhesive layer formed on the release liner to a supporting body having a thickness of 2 μm by the same method as in Example 1.

Comparative Example 1

A pressure-sensitive adhesive composition was prepared by almost the same method as in Example 1, except that the (meth)acrylic polymer 3 was not used. Then, a pressure-sensitive adhesive sheet (single-sided pressure-sensitive adhesive tape) having a total thickness of 45 μm was created by the same method as in Example 1.

Comparative Example 2

A pressure-sensitive adhesive composition was prepared by almost the same method as in Example 2, except that the (meth)acrylic polymer 3 was not used. Then, a pressure-sensitive adhesive sheet (single-sided pressure-sensitive adhesive tape) having a total thickness of 45 μm was created by the same method as in Example 1.

Comparative Example 3

A pressure-sensitive adhesive composition was prepared by almost the same method as in Example 5, except that the (meth)acrylic polymer 3 was not used. However, the amount of the trimethylolpropane triacrylate (TMPTA) to be added as a cross-linking agent was 0.09 parts by mass. Then, a pressure-sensitive adhesive sheet (single-sided pressure-sensitive adhesive tape) having a total thickness of 75 μm was created by the same method as in Example 5. Each of the materials used for preparing the pressure-sensitive adhesive compositions according to the aforementioned Examples 1 to 6 and Comparative Examples 1 to 3 is listed in Table 2. Table 2 lists the types and parts by mass of the polymer (B) and the types and parts by mass of additive and cross-linking agents, based on 100 parts by mass of the polymer (A).

at room temperature (20 to 25° C.) for 1 week; a solvent (ethyl acetate) insoluble component was taken out to be dried at 130° C. for 2 hours and then weighed (mass after dipping and drying); and the ratio was calculated by using an equation for calculating a "ratio of solvent-insoluble component (% by mass)=[(mass after dipping and drying)/(mass before dipping)]×100". Measurement results of the ratio of the solvent-insoluble component are shown in Table 2.

(Test Method)
[180°-Peeling Pressure-Sensitive Adhesive Force Test]

In the case of a double-sided pressure-sensitive adhesive sheet having pressure-sensitive adhesive layers on both surfaces of a substrate, of the pressure-sensitive adhesive sheets according to each Example and each Comparative Example, a test specimen was produced: by peeling the release liner (polyester film) on one side of the pressure-sensitive adhesive sheet such that a polyethylene terephthalate film having a thickness of 25 μm was attached to the exposed pressure-sensitive adhesive layer; and by cutting the attached object so as to have a width of 20 mm. In the case of a single-sided pressure-sensitive adhesive sheet having a pressure-sensitive adhesive layer on one surface of a substrate, of the pressure-sensitive adhesive sheets according to each Example and each Comparative Example, a test specimen was produced by cutting the sheet so as to have a width of 20 mm. Also, a stainless steel plate (430 BA) cleaned with toluene was provided. Then, the release liner (polyester film) on the other side of the pressure-sensitive adhesive sheet was peeled, and the pressure-sensitive adhesive surface of the sheet was attached to the SUS plate (430 BA plate) by reciprocating a 2-kg roller.

Then, pressure-sensitive adhesive sheets, left under the following three conditions, respectively, were produced for each Example and each Comparative Example:

(i) left at 23° C. for 10 seconds after the pressure-sensitive adhesive sheet was attached to the SUS plate (430 BA plate) (condition immediately after attachment);

(ii) left at 23° C. for 30 minutes after the pressure-sensitive adhesive sheet was attached to the SUS plate (430 BA plate) (initial condition); and

TABLE 2

| | Polymer (A) 100 Parts by Mass | Polymer (B) Type | Polymer (B) Parts by Mass | Additive (YS Polystar S-145) Parts by Mass | Cross-linking Agent (Polyfunctional Monomer) Parts by Mass | Cross-linking Agent (CORONATE L) Parts by Mass | Gel Fraction (%) |
|---|---|---|---|---|---|---|---|
| Example 1 | 2EHA/AA = 95/5 | (Meta)Acrylic Polymer 3 | 5 | — | — | 1 | 39.5 |
| Example 2 | 2EHA/AA = 95/5 | (Meta)Acrylic Polymer 3 | 5 | 20 | — | 1 | 33.9 |
| Example 3 | 2EHA/AA = 95/5 | (Meta)Acrylic Polymer 4 | 5 | — | — | 1 | 40.5 |
| Example 4 | 2EHA/AA = 95/5 | (Meta)Acrylic Polymer 4 | 5 | 20 | — | 1 | 39.5 |
| Example 5 | 2EHA/AA = 94/6 | (Meta)Acrylic Polymer 3 | 4 | — | 0.07 | — | 71.7 |
| Example 6 | 2EHA/AA = 95/5 | (Meta)Acrylic Polymer 3 | 5 | — | — | 1 | — |
| Comparative Example 1 | 2EHA/AA = 95/5 | — | | — | — | 1 | 38.9 |
| Comparative Example 2 | 2EHA/AA = 95/5 | — | | 20 | — | 1 | 32.3 |
| Comparative Example 3 | 2EHA/AA = 94/6 | — | | — | 0.09 | — | 83.5 |

(Measurement of Ratio of Solvent-Insoluble Component)

A ratio of a solvent-insoluble component (gel fraction) was calculated in the following way: after 0.1 g of a pressure-sensitive adhesive composition was sampled and precisely weighed (mass before dipping), the sampled composition was dipped in approximately 50 ml of ethyl acetate (iii) left at 80° C. for 5 minutes after the pressure-sensitive adhesive sheet was attached to the SUS plate (430 BA plate), and thereafter further left at 23° C. for 30 minutes (aging condition).

For each of the pressure-sensitive adhesive sheets produced under the conditions (i) to (iii), pressure-sensitive adhesive force (resistance force) (unit: N/20 mm) to an adherend, occurring when the other end of the sheet was peeled in the 180°-peeling direction at speed of 300 mm/min, was measured. The case, where: the pressure-sensitive adhesive force N1, occurring immediately after attachment, is 1 N or less; the pressure-sensitive adhesive force N2, occurring after aging, is 3 N or more; and N2/N1 is 5 or more, was evaluated as good (properties with respect to rework and an increase occurring over time were O), while the case, where the pressure-sensitive adhesive force N1, occurring immediately after attachment, is 1.0 N or more; or the pressure-sensitive adhesive force N2, occurring after aging, is less than 3 N; or N2/N1 is less than 5, was evaluated as bad (properties with respect to rework and an increase occurring over time were x). Measurement results of the 180°-peeling pressure-sensitive adhesive force are shown in Table 3. As shown in Table 3, the properties with respect to rework and an increase occurring over time are good for the pressure-sensitive adhesive sheets according to Examples 1 to 6 in each of which a pressure-sensitive adhesive composition is prepared by using a (meth)acrylic polymer.

[Shear Storage Modulus]

The storage modulus (G') of the pressure-sensitive adhesive layer used in each Example and each Comparative Example was evaluated by the following method. A test specimen (2 mm in thickness×7.9 mmϕ) was produced by using the pressure-sensitive adhesive layer-forming materials that had been used in Examples, and a shear storage modulus (G' [Pa]) was measured at a frequency of 1 Hz, at a heating rate of 5° C./min, and within a temperature range of −50° C. to 100° C. and by using a dynamic viscoelasticity measuring device (product name "ARES" made by Rheometrics Scientific Inc.) Measurement results of the shear storage modulus (G') at 23° C. of the pressure-sensitive adhesive are shown in Table 3. As shown in Table 3, the shear storage modulus of the pressure-sensitive adhesive of each Example is proper hardness as a pressure-sensitive adhesive. The storage modulus is preferably $1 \times 10^6$ Pa or less.

[Bubble Releasability]

Figure 2:
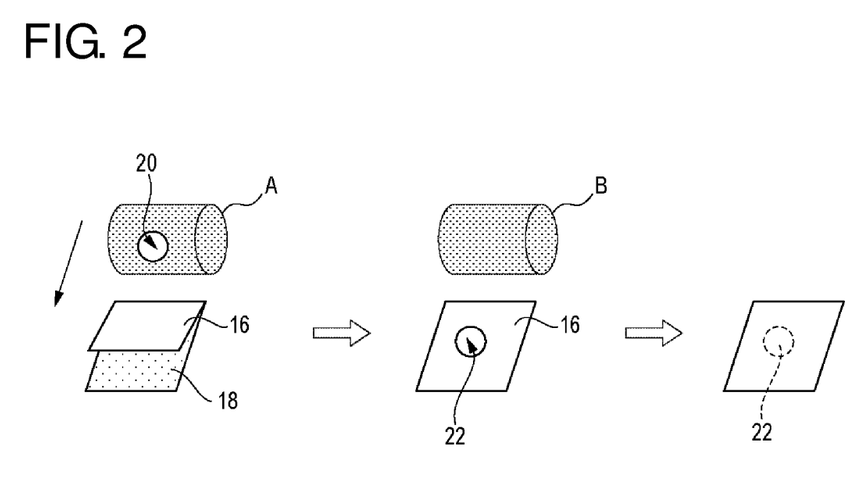
FIG. 2 is a schematic view for explaining a test method for bubble releasability.

FIG. 2 is a schematic view for explaining a test method for bubble releasability. In the case of a double-sided pressure-sensitive adhesive sheet having pressure-sensitive adhesive layers on both the surfaces of a substrate, of the pressure-sensitive adhesive sheets according to each Example and each Comparative Example, a test specimen 16 was produced: by peeling the release liner on one side of the sheet such that a polyethylene terephthalate film having a thickness of 25 μm is attached to the exposed pressure-sensitive adhesive layer; and then by cutting the attached object so as to have a square size of 30 mm×30 mm. In the case of a single-sided pressure-sensitive adhesive sheet having a pressure-sensitive adhesive layer on one surface of a substrate, of the pressure-sensitive adhesive sheets according to each Example and each Comparative Example, a test specimen 16 was produced by cutting the sheet so as to have a square size of 30 mm×30 mm. Also, a stainless steel plate (430 BA) 18 cleaned with toluene was provided.

When the test specimen 16 is first pressure-bonded to the stainless steel plate (430 BA) 18 by using a 2-kg roller A (width: 40 mm) with a circular open hole having a radius of 10 mm and a depth of 1 mm, a bubble 22 is mixed in by a hole 20 provided in the 2-kg roller A. Thereafter, the surface of the test specimen 16 is pressed, within 10 seconds, with a 2-kg roller B without an open hole, so that the test specimen 16 and the stainless steel plate 18 are pressure-bonded together again. As a result, the case where the bubble had been released (extruded) was evaluated as good (◯), while the case where the bubble had not been released was evaluated as bad (x). Measurement results of the bubble releasability are shown in Table 3. As shown in Table 3, the pressure-sensitive adhesive sheet according to each of Examples 1 to 6, having the pressure-sensitive adhesive force N1 occurring immediately after attachment of 1.0 N or less, has a good bubble releasing property.

As described above, a pressure-sensitive adhesive sheet according to the present embodiment exemplified in Examples 1 to 6 has small pressure-sensitive adhesive force occurring immediately after attachment, and hence the sheet can be easily reattached even if a bubble is mixed in or an attachment position is misaligned. In particular, when an adherend is a brittle material, the adherend can be made not likely to be damaged when reattached. Further, an adherend can be firmly fixed because pressure-sensitive adhesive force is increased over time. Furthermore, even if bubbles

TABLE 3

| | Tape Thickness | | | | Adhesive Force to SUS (4430 BA) (N/20 mm) | | | Pressure-Sensitive Adhesive Force | Shear Storage Modules at 23° C. | |
|---|---|---|---|---|---|---|---|---|---|---|
| | | | | | 23° C. | | 80° C. | Rework + | of | |
| | Substrate Thickness [μm] | Adhesive Layer Thickness [μm] | Total Thickness [μm] | Tape Configuration | after 10 seconds (N1) | 23° C. after 30 minutes | after 5 minutes (N2) | N2/N1 | Property of Over-time Increase | Pressure Sensitive Adhesive G' [Pa] | Bubble Releasability |
| Example 1 | 25 | 20 | 45 | Single-seided Tape | 0.09 | 0.13 | 7.8 | 86.7 | ◯ | $7.8 \times 10^4$ | ◯ |
| Example 2 | 25 | 20 | 45 | Single-seided Tape | 0.10 | 0.11 | 11.0 | 110.0 | ◯ | | ◯ |
| Example 3 | 25 | 20 | 45 | Single-seided Tape | 0.08 | 0.10 | 51 | 63.8 | ◯ | $7.4 \times 10^4$ | ◯ |
| Example 4 | 25 | 20 | 45 | Single-seided Tape | 0.06 | 0.08 | 5.5 | 91.7 | ◯ | | ◯ |
| Example 5 | 25 | 50 | 75 | Single-seided Tape | 0.55 | 1.20 | 6.8 | 12.4 | ◯ | $1.0 \times 10^5$ | ◯ |
| Example 6 | 2 | 4 | 10 | Double-sided Tape | 0.07 | 0.08 | 5.8 | 82.9 | ◯ | | ◯ |
| Comparative Example 1 | 25 | 20 | 45 | Single-seided Tape | 7.1 | 9.5 | 105 | 14.8 | x | $7.1 \times 10^4$ | x |
| Comparative Example 2 | 25 | 20 | 45 | Single-seided Tape | 9.7 | 9.9 | 10.8 | 1.1 | x | | x |
| Comparative Example 3 | 25 | 50 | 75 | Single-seided Tape | 12.4 | 13.2 | 14.5 | 1.2 | x | $9.3 \times 10^4$ | x | are mixed in, they can be removed (reduced) without reattaching the pressure-sensitive adhesive sheet, by pressure-bonding the sheet again in a state where the sheet is being adhered to an adherend.

In other words, when the pressure-sensitive adhesive force, occurring immediately after attachment (after 10 seconds), is small, the pressure-sensitive adhesive sheet is easily released (peeled) from an adherend, and hence bubbles easily migrate between the sheet and the adherend, thereby allowing the bubbles to be extruded. Further, the subsequent pressure-sensitive adhesive force is increased, thereby allowing the adherend to be firmly fixed.

The present invention should not be limited to the aforementioned embodiments, and various modifications, such as design modifications, can be made with respect to the above embodiments based on the knowledge of those skilled in the art, and an embodiment with such a modification can fall within the scope of the invention.

The invention claimed is:

1. A pressure-sensitive adhesive sheet comprising:
a substrate; and
a pressure-sensitive adhesive layer laminated on at least one side of the substrate,
the pressure-sensitive adhesive sheet being configured such that: pressure-sensitive adhesive force N1, occurring after the pressure-sensitive adhesive layer is attached to a stainless steel plate (430 BA plate) and is left at 23° C. for 10 seconds, is 1.0 [N/20 mm] or less; pressure-sensitive adhesive force N2, occurring after the pressure-sensitive adhesive layer is attached and is aged at 80° C. for 5 minutes, is 3.0 [N/20 mm] or more; and N2/N1 is 5.0 or more, wherein
the pressure-sensitive adhesive layer includes:
100 parts by mass of a polymer (A) having a glass transition temperature lower than 0° C.; and
0.1 to 20 parts by mass of a polymer (B) that contains, as monomer units, one of monomers (B1) having a functional group equivalent of 1000 g/mol or more but less than 15000 g/mol and having a polyorganosiloxane backbone and one of monomers (B2) producing a glass transition temperature of 40° C. or higher, and that has a weight average molecular weight of 10000 or more but less than 100000 (B),
the content of the monomer (B1) is 5% by mass or more but 50% by mass or less based on the mass of the total monomer components of the polymer (B),
the content of the monomer (B2) producing a glass transition temperature of 40° C. or higher is 10% by mass to 80% by mass based on the mass of the total monomer components of the polymer (B),
said one of monomers (B2) is a (meth)acrylic acid alkyl ester, and
a total thickness of the pressure-sensitive adhesive sheet is 3 μm or more but 500 μm or less.

2. The pressure-sensitive adhesive sheet according to claim 1, wherein storage modulus at 23° C. of the pressure-sensitive adhesive layer, which is measured under a condition of shear strain at a frequency of 1 Hz by dynamic viscoelasticity measurement, is 1×10$^6$ Pa or less.

3. The pressure-sensitive adhesive sheet according to claim 1, wherein a thickness of the substrate is 1 μm or more but 100 μm or less.

4. The pressure-sensitive adhesive sheet according to claim 1, wherein the polymer (A) is an acrylic polymer.

5. The pressure-sensitive adhesive sheet according to claim 1, wherein the monomer having a polyorganosiloxane backbone is one or more monomers selected from the group consisting of monomers represented by the following general formula (1) or (2):

[Chemical Formula 1]

(1)

[Chemical Formula 2]

(2)

[In Chemical Formulae (1) and (2), $R^3$ is hydrogen or methyl, $R^4$ is methyl or a monovalent organic group, and m and n are integers of 0 or more.]

6. The pressure-sensitive adhesive sheet according to claim 1, wherein the functional group equivalent of monomer (B1) is 1000 g/mol or more but 4600 g/mol or less.

7. A pressure-sensitive adhesive sheet comprising:
a substrate; and
a pressure-sensitive adhesive layer laminated on at least one side of the substrate,
the pressure-sensitive adhesive sheet being configured such that: pressure-sensitive adhesive force N1, occurring after the pressure-sensitive adhesive layer is attached to a stainless steel plate (430 BA plate) and is left at 23° C. for 10 seconds, is 1.0 [N/20 mm] or less; pressure-sensitive adhesive force N2, occurring after the pressure-sensitive adhesive layer is attached and is aged at 80° C. for 5 minutes, is 3.0 [N/20 mm] or more; and N2/N1 is 5.0 or more, wherein
the pressure-sensitive adhesive layer includes:
100 parts by mass of a polymer (A) having a glass transition temperature lower than 0° C.; and
0.1 to 20 parts by mass of a polymer (B) that contains, as monomer units, one of monomers (B1) having a functional group equivalent of 1000 g/mol or more but less than 15000 g/mol and having a polyorganosiloxane backbone and one of monomers (B2) producing a glass transition temperature of 40° C. or higher, and that has a weight average molecular weight of 10000 or more but less than 100000 (B),
the polymer (B) does not include fluorine-containing monomer units,
the content of the monomer (B1) is 5% by mass or more but 50% by mass or less based on the mass of the total monomer components of the polymer (B),
the content of the monomer (B2) producing a glass transition temperature of 40° C. or higher is 10% by mass to 80% by mass based on the mass of the total monomer components of the polymer (B),
said one of monomers (B2) is a (meth)acrylic acid alkyl ester, and
a total thickness of the pressure-sensitive adhesive sheet is 3 μm or more but 500 μm or less.

8. The pressure-sensitive adhesive sheet according to claim 7, wherein storage modulus at 23° C. of the pressure- sensitive adhesive layer, which is measured under a condition of shear strain at a frequency of 1 Hz by dynamic viscoelasticity measurement, is $1 \times 10^6$ Pa or less.

9. The pressure-sensitive adhesive sheet according to claim 7, wherein a thickness of the substrate is 1 µm or more but 100 µm or less.

10. The pressure-sensitive adhesive sheet according to claim 7, wherein the polymer (A) is an acrylic polymer.

11. The pressure-sensitive adhesive sheet according to claim 7, wherein the monomer having a polyorganosiloxane backbone is one or more monomers selected from the group consisting of monomers represented by the following general formula (1) or (2):

[Chemical Formula 1]

(1)

[Chemical Formula 2]

(2)

[In Chemical Formulae (1) and (2), $R^3$ is hydrogen or methyl, $R^4$ is methyl or a monovalent organic group, and m and n are integers of 0 or more.]

12. The pressure-sensitive adhesive sheet according to claim 7, wherein the functional group equivalent of monomer (B1) is 1000 g/mol or more but 4600 g/mol or less.

* * * * *